United States Patent
Hulth

(10) Patent No.: US 10,296,869 B2
(45) Date of Patent: May 21, 2019

(54) DETERMINATION OF A PRODUCT POSITION ALONG A FIXTURE OR POSITIONS OF OBJECTS IN IMAGES

(71) Applicant: Pricer AB, Stockholm (SE)

(72) Inventor: Nils Hulth, Uppsala (SE)

(73) Assignee: Pricer AB, Stockholm (SE)

( * ) Notice: Subject to any disclaimer, the term of this patent is extended or adjusted under 35 U.S.C. 154(b) by 195 days.

(21) Appl. No.: 15/287,992

(22) Filed: Oct. 7, 2016

(65) Prior Publication Data

US 2017/0103515 A1 Apr. 13, 2017

(30) Foreign Application Priority Data

Oct. 9, 2015 (EP) ..................................... 15189161
Apr. 4, 2016 (EP) ..................................... 16163751

(51) Int. Cl.
*G06K 9/00* (2006.01)
*G06Q 10/08* (2012.01)
(Continued)

(52) U.S. Cl.
CPC ....... *G06Q 10/087* (2013.01); *G06K 17/0022* (2013.01); *G06Q 10/08* (2013.01);
(Continued)

(58) Field of Classification Search
CPC ............ G06K 17/0022; G02F 1/13473; G02F 1/13718; G02F 2001/133397; G02F 2001/13478
(Continued)

(56) References Cited

U.S. PATENT DOCUMENTS 6,496,121 B2 * 12/2002 Otto ........................ G06F 3/147
340/691.6
6,753,830 B2 * 6/2004 Gelbman ................ G06F 3/147
340/5.91
(Continued)

FOREIGN PATENT DOCUMENTS

WO 2011021862 A2 2/2011

OTHER PUBLICATIONS

Corresponding European Application 15189161.1, European Search Report dated Feb. 22, 2016.
(Continued)

*Primary Examiner* — Charlotte M Baker
(74) *Attorney, Agent, or Firm* — Cooper Legal Group, LLC; Ronald M. Kachmarik

(57) ABSTRACT

Products are arranged at positions along a fixture. Electronic labels associated with the products are arranged such that a product position for a product is obtainable once a position of the label is known. A camera is arranged to capture images of the fixture. A method includes controlling a label to change optical output; receiving an image containing the label and captured after the change of optical output has been initiated; detecting a position of the label in the image based on a characteristic associated with the change; and determining a position for the product associated with the label in an image. The determined position may be employed to determine when to restock a product. Further, a method for determining positions of labels in images is provided, as well a corresponding system and computer program product. The labels are controlled to include changing temporal patterns.

25 Claims, 9 Drawing Sheets

(51) Int. Cl.
  *G06K 17/00* (2006.01)
  *G06T 7/70* (2017.01)
  *G06T 7/62* (2017.01)
(52) U.S. Cl.
  CPC ............... *G06T 7/62* (2017.01); *G06T 7/70* (2017.01); *G06T 2207/10016* (2013.01)
(58) Field of Classification Search
  USPC ................................ 382/103; 345/55, 2, 87
  See application file for complete search history.

(56) References Cited

U.S. PATENT DOCUMENTS

| | | |
|---|---|---|
| 9,367,770 B2* | 6/2016 | Footen .................... G06K 9/78 |
| 2008/0077510 A1 | 3/2008 | Dielemans |
| 2009/0121017 A1 | 5/2009 | Cato et al. |
| 2010/0065632 A1 | 3/2010 | Babcock et al. |
| 2014/0118536 A1 | 5/2014 | Morin et al. |

OTHER PUBLICATIONS

Corresponding European Application 16163751.7, European Search Report dated May 19, 2016.

\* cited by examiner

DETERMINATION OF A PRODUCT POSITION ALONG A FIXTURE OR POSITIONS OF OBJECTS IN IMAGES

TECHNICAL FIELD

The present disclosure generally relates determination of positions of objects.

BACKGROUND

Products in a retail store may be arranged at respective product positions along fixtures such as shelves, racks or other displays. The product positions may for example be selected to maximize sales by promoting certain products and/or to improve logistics of the store. Product positions for at least some products may be changed quite often and it may be difficult to maintain an updated record of the actual product positions.

Knowledge of the actual product positions may for example save time when products are restocked as persons bringing new items of the products to the fixtures of the store (e.g. from a storage room, a warehouse, or a supply truck) need not search through the fixtures of the store for the correct product positions at which to arrange the new items of the respective products. It is also important to detect low stock on the shelves as soon as possible since low stock on the shelves may lead to a lost sales opportunity for the retail store.

However, the resolution provided in images captured by cameras employed in many video-based security systems may be too low to detect the identity of a product that needs to be restocked. Therefore, unless the person performing the restocking brings items off all products that may potentially need to be restocked to the shelf, the person may need to go to the shelf to check which product to restock before bringing the appropriate items from a storage room, warehouse or supply truck. Knowledge of the actual product positions for the respective products may therefore make restocking more efficient.

Some objects may be difficult to detect or distinguish in images captured by a camera, for example due to low image resolution or poor illumination in an area (or room) in which the images were captured. Electronic labels, employed in retail stores for displaying information about products, may for example be difficult to distinguish in images captured by a camera. Although image processing sometimes allows objects to be detected in images, even when the image quality is rather poor, it would be advantageous to provide new methods for determining positions of electronic labels in images.

SUMMARY

To better address one or more of the above mentioned issues, methods and systems having the features defined in the independent claims are provided. Associated computer programs are also provided. Preferable embodiments are defined in the dependent claims.

Hence, according to a first aspect, a method for analyzing an image of a fixture is provided. Products are arranged at respective product positions along the fixture. Electronic labels associated with the respective products are arranged such that a product position for a product is obtainable once a position of the associated label is known. A camera is arranged to capture images of the fixture. The method comprises controlling an electronic label of the electronic labels to change optical output. The method comprises receiving, from the camera, an image containing the electronic label and captured after the change of optical output has been initiated. The method comprises detecting a position of the electronic label in the image based on a characteristic associated with the change of optical output, and determining, based on the detected position, a product position for the product associated with the electronic label in an image received from the camera.

It may be difficult to recognize different products in an image, for example due to low resolution of the image or due to poor illumination in an area (or room) in which the image is captured. Changing the optical output of the electronic label allows the electronic label to be more easily distinguishable. Since the product position for a product is obtainable once a position of the associated electronic label is known, the detected position of the electronic label in an image received from the camera may serve as a guide for determining the product position for the product associated with the electronic label in an image received from the camera.

As described above, knowledge of the product position may for example allow for providing more efficient restocking of products. As the electronic labels are already arranged at the fixture for other purposes, such as conveying information about the associated products to customers, the present method requires no extra devices or arrangements at the fixture.

The products may for example be arranged at respective product positions distributed along (or in, or within) the fixture.

At a given point in time, a product position may for example be empty, or may comprise one or more items of the associated product.

The fixture may for example be a shelf, rack or some other type of display for arrangement in a retail store.

The electronic labels may for example be arranged for optically conveying information about the respective products, such as prices of the products.

The electronic labels may for example be arranged such that a product position for a product is derivable (or computable, or possible to determine) once a position of the associated electronic label is known.

The electronic labels may for example be arranged at respective predetermined (or predefined) positions relative to the respective associated products.

The camera may for example be a regular camera arranged to capture snap shots of the fixture, or a video camera arranged to capture images of the fixture at a certain frame rate.

The electronic label may for example be controlled via wireless communication, such as wireless communication based on infrared light or radio waves, and/or via wired communication.

It will be appreciated that the electronic label may for example comprise a light source arranged to emit light and/or may provide light output via reflection of light from external light sources (such as light from a lamp in a ceiling in which the electronic label is arranged).

The change of optical output may for example include a change of optical output in the visible range and/or a change of optical output in the infrared range.

The change of optical output may for example include a change of intensity or a change of spectrum of the light output of the electronic label.

A characteristic associated with the change of optical output may for example be an effect (or result) of the change of optical output visible (or distinguishable) in an image received from the camera.

The product position may for example be determined in the same image as in which the label positions is detected, or in another image captured by the camera.

According to some embodiments, determining a product position for the product associated with the electronic label in an image received from the camera, the product position may be determined via computation by the processing section based on the detected position and based on knowledge of a location of the product position relative to the detected position.

According to some embodiments, the method may comprise determining, by at least analyzing the image received from the camera, whether there are any items of the product at the determined product position.

It may be difficult to determine, based on an image, whether a product position associated with a specific product is empty. However, if the location of that product is known in the image, then such a determination may be facilitated as one knows where to look for empty space. Further, if empty space is detected in the image, one may tell to which of the product positions it corresponds (at least if all the product positions along the fixture have been determined).

Empty space at a product position may for example be determined by detecting regions having different color than the expected color of items of the product associated with that product position.

Empty space at a product position may for example be determined by detecting shadows or darker regions between or in front of items arranged at a product position. Such shadows or darker region may indicate room for additional items.

Empty space at a product position may for example be detected by comparing an image captured by the camera to a reference image captured by the camera at a point in time when the product position was full of items of the product or when the product position was completely empty.

According to some embodiments, the method may comprise in response to a determination that there are no items of the product at the product position, signaling that the product associated with the electronic label needs to be restocked. Since the signaling includes an indication of the product to be restocked, restocking may be performed sooner and/or more efficiently.

The signaling may for example be provided to a database, to a restocking system, or to person assigned to perform the restocking.

According to some embodiments, the method may comprise determining, by at least analyzing the image received from the camera, whether there is room for more items of the product at the determined product position.

Once the product position is known in the image, an empty space (or an empty spot) in the image at that position may be considered an indication that there is room for one or more items of the product. Empty space may for example be detected as an empty space at the side of items of the product, or as an empty space in front of items of the product.

Empty space may for example be determined by analyzing colors or shadows of the image, or by comparing the image to a reference image captured by the camera at a point in time when the product position was full of items of the product.

According to some embodiments, the method may comprise in response to a determination that there is room for more items of the product at the product position, signaling that there is room for restocking the product associated with the electronic label.

The signaling may for example comprise an estimate of how much room there is available for restocking the product, or an estimate of the number of additional items that may fit into the product position.

In some embodiments, the signaling that there is room for restocking the product may only be performed in case it is determined (or estimated) that at least a certain portion/fraction (such as one half, one third or one fourth) of the product position is empty.

According to some embodiments, the method may further comprise detecting, by at least analyzing the image received from the camera, whether any shelf talkers are arranged at one or more positions associated with the determined product position, and determining whether one or more detected shelf talkers comply with a prescribed shelf talker arrangement for the product associated with the electronic label.

Shelf talkers may be printed cards or other signs mounted at (or attached to) the fixture to bring the attention of customers to a particular product arranged at the fixture. Shelf talkers may for example include information about the associated product, such as "organic", "gluten free" or "healthy". Shelf talkers may for example include information about a special deal or sale associated with the product. Shelf talkers may for example include one or more electronic components such as light sources, displays or sound generating components.

Some products may be associated with prescribed shelf talker arrangements. For example, a manufacturer of the product or the store management may have decided that certain shelf talkers are to be arranged at prescribed positions associated with the product position. The prescribed shelf talker arrangement for a product may include positioning of shelf talkers, size and/or color of shelf talkers, and/or certain text displayed on the shelf talkers.

A position associated with the determined product position may for example be a position adjacent to the determined product position, or a predefined position relative to the determined product position (such as a certain distance above or below the product position, or at an end of the fixture at which the product position is located), or a predefined position relative to the electronic label.

The method may for example comprise signaling that one or more shelf talkers not complying with the prescribed shelf talker arrangement should be replaced or removed.

According to some embodiments, the fixture may be arranged in an area, and the method may further comprise estimating, based on the determined product position in the image, a product position in (or along) the fixture, and estimating, based on the estimated product position in the fixture and based on a position and orientation of the fixture in the area, a product position in the area.

The position and orientation of the fixture in the area may for example be received from a memory or database. The position and orientation of the fixture may for example be determined manually or may be determined automatically as described further below.

The product position in the fixture may for example correspond to a portion of the fixture, such as "the third position/slot from the left on the second shelf from the top of the fixture".

According to some embodiments, the method may comprise receiving, from the camera, an image containing the electronic label and captured before the change of optical output has been initiated, and receiving, from the camera, an image containing the electronic label and captured after the change of optical output has been initiated. The method may comprise detecting the position of the electronic label in the received images by at least analyzing a difference between the images captured before and after the change of optical output has been initiated.

The change of optical output may for example be detectable by analyzing the difference between the two images even if the electronic label is difficult to detect in any one of the two images.

According to some embodiments, the method may comprise controlling the electronic labels to change their respective optical outputs, wherein the changes of optical outputs of the respective electronic labels include respective distinct (or unique) temporal or spatial patterns of optical changes. The method may comprise receiving, from the camera, a plurality (or sequence) of images containing at least some of the electronic labels and captured after at least one of the changes of optical outputs has been initiated. The method may comprise detecting positions of the respective electronic labels in the images by at least analyzing the images, wherein identities of the respective electronic labels in the images are identified via the respective distinct temporal or spatial patterns of optical changes, and determining, based on the detected positions, product positions for the respective products associated with the respective electronic labels in an image received from the camera.

It will be appreciated that the changes of optical outputs of the respective electronic labels may for example include respective distinct temporal and spatial patterns of optical changes.

A temporal pattern may for example include a sequence of optical changes.

A spatial pattern may for example include a pattern (e.g. including one or more symbols or colors) visible at a given point in time, for example on a display of an electronic label.

The use of distinct temporal or spatial patterns to identify the electronic labels allows for identifying multiple electronic labels simultaneously.

According to some embodiments, the method may comprise controlling the electronic labels to change their respective optical outputs at respective distinct (or unique) points in time, and receiving, from the camera, a sequence of images containing at least some of the electronic labels and captured between the respective points in time. The method may comprise detecting positions of the respective electronic labels in the images by at least analyzing the images, wherein identities of the respective electronic labels in the images are identified via points in time for which changes of optical outputs for the respective electronic labels in the images are detected, and determining, based on the detected positions, product positions for the respective products associated with the respective electronic labels in an image received from the camera.

The use of timing to determine identities of electronic labels in the images is simpler than using the above described distinct patterns, and may allow for use of less advanced electronic labels and/or a cheaper camera.

According to some embodiments, the fixture may be arranged in an area, and the method may comprise estimating, based on at least some of the detected label positions, a size, shape and position of the fixture in the images, and estimating a position or orientation of the fixture in the area based on the estimated size, shape and position of the fixture in the images and based on knowledge of a real size and shape of the fixture.

It will be appreciated that both the position and the orientation of the fixture may for example be determined.

Knowledge of camera attributes such as position, orientation and field-of-view of the camera may for example be employed when estimating the position and/or orientation of the fixture in the area.

Positions and orientations of fixtures in a retail store may for example be visualized in a floor plan to show customers how to find their way in the store, to find a specific product on the floor plan, or to show where emergency exits or fire extinguishers are arranged. As time passes, positions and orientations of fixtures in the retail store may need to be modified, e.g. to comply with new regulations or to follow upcoming market trends. Determination of the current position and/or orientation of the fixtures in accordance with the present embodiments allows for maintaining an updated floor plan.

According to a second aspect, there is provided a computer program product comprising a computer-readable medium with instructions for performing the method according to any embodiment of the first aspect.

The advantages presented above for features of methods, according to the first aspect, may generally be valid for the corresponding features of computer programs products according to the second aspect.

The computer-readable medium may for example store or carry instructions for causing a computer to perform the method according to any embodiment of the first aspect.

The computer-readable medium may for example be a transitory storage medium (such as a carrier wave), or a non-transitory storage medium.

According to a third aspect, there is provided a system for analyzing an image of a fixture. Products are arranged at respective product positions along the fixture. Electronic labels associated with the respective products are arranged such that a product position for a product is obtainable once a position of the associated electronic label is known. A camera is arranged to capture images of the fixture. The system comprises a processing section. The processing section is configured to control an electronic label to change optical output. The processing section is configured to receive, from the camera, an image containing the electronic label and captured after the change of optical output has been initiated. The processing section is configured to detect a position of the electronic label in the image based on a characteristic associated with the change of optical output, and to determine, based on the detected position, a product position for the product associated with the electronic label in an image received from the camera.

The advantages presented above for features of methods, according to the first aspect, may generally be valid for the corresponding features of systems according to the third aspect.

The system may for example comprise a camera arranged to capture images of the fixture.

The system may for example comprise electronic labels associated with the respective products and arranged such that a product position for a product is obtainable once a position of the electronic label is known. The electronic labels may for example be arranged to convey information about the respective products and to change their respective optical outputs in response to control signals from the processing section.

It is noted that embodiments of the present disclosure relate to all possible combinations of features recited in the claims. Further, it will be appreciated that the various embodiments described for the method, according to the first aspect, are all combinable with embodiments of the system according to the third aspect.

According to a fourth aspect, a method for determining positions of electronic labels in images is provided. The method comprises controlling, via at least one control signal (or via a plurality of control signals), the electronic labels to change their respective optical outputs. The changes of optical outputs of the respective electronic labels include respective distinct temporal patterns of optical changes. The method comprises receiving a plurality of images containing the electronic labels (or containing at least some of the electronic labels) and captured by a camera at points in time such that the distinct temporal patterns of optical changes are distinguishable in the images. The method comprises detecting the distinct temporal patterns of optical changes in the images by at least analyzing the images. The method comprises determining positions of the respective electronic labels in the images as positions in the images at which the corresponding distinct temporal patterns of optical changes have been detected.

As described above, it may be difficult to detect electronic labels in an image, for example due to low resolution of the image or due to poor illumination in an area (or room) in which the image is captured. Even if the electronic labels may be detected in an image, it may be difficult to distinguish between the different electronic labels in the image as all the electronic labels may look very similar.

Controlling the electronic labels to change their respective optical outputs allows the electronic labels to be more easily detected in the images captured by the camera. The distinct (or unique) temporal patterns of optical changes employed for the respective electronic labels allow the different electronic labels to be more easily distinguished from each other in the images such that the positions of the individual electronic labels may be determined in the images.

Rather than determining positions of the electronic labels one at a time, by controlling one electronic label at a time to change its optical output, the use of distinct temporal patterns of optical changes for the respective electronic labels allows the positions of the electronic labels to be determined simultaneously. In other words, the distinct temporal patterns of optical changes allow for faster determination of the positions of the electronic labels in images captured by the camera.

It will be appreciated that the distinct temporal patterns of optical changes provided by the respective electronic labels need not necessarily be synchronized with each other. As long as it is possible to determine when a temporal pattern of optical changes starts (for example via a certain starting signal provided by the electronic labels before initiating the respective temporal patterns of optical changes), and as long as a the images are captured at least as often as the optical changes occur, the temporal patterns of optical changes may be correctly detected in the images.

The images may for example be captured by the camera at an image capture rate which is at least as high as (or higher than) the rate of optical changes provided by the electronic labels.

The images captured by the camera may for example be digital images.

The camera may for example be a regular camera arranged to capture snap shots of the fixture, or a video camera arranged to capture images of the fixture at a certain frame rate.

The images may for example be received from the camera.

The distinct temporal patterns of optical changes may for example be detected in the images via image processing (e.g. via digital image processing).

The control signals may for example be wired or wireless control signals (e.g. provided via infrared light or radio waves).

It will be appreciated that the electronic labels may for example comprise light sources arranged to emit light and/or may provide light output via reflection of light from external light sources (such as light from a lamp in a ceiling of a room in which the electronic label is arranged).

According to some embodiments, the method may comprise, for each of a plurality of time intervals: controlling a subset of the electronic labels to provide optical outputs distinguishing the electronic labels in the subset from the other electronic labels; receiving an image containing the electronic labels and captured by the camera during the time interval; and detecting, by at least analyzing the image, at least one position in the image corresponding to a position of an electronic label from the subset (i.e. at least one position of an electronic label from the subset may be detected in the image by analyzing the image, but the identity of the electronic label located at this particular position in the image may be unknown as the electronic labels in the subset may not necessarily be distinguishable from each other during this time interval). Different subsets of the electronic labels may be controlled to provide the distinguishable optical output for the different time intervals, such that the distinct temporal patterns of optical changes are provided by the respective electronic labels. The distinct temporal patterns of optical changes may be detected in the images based on the positions detected in the respective images (i.e. based on the positions detected in the images captured by the camera during the respective time intervals).

Synchronization of the distinct temporal patterns of optical changes to certain time intervals, as provided by the present embodiments, facilitates detection of the temporal patterns in the images, and allows for a reduction of the number of images employed to detect the temporal patterns.

It will be appreciated that if a subset of electronic labels is controlled to provide optical outputs distinguishable from the optical outputs of the other electronic labels during a time interval, then positions of the electronic labels from the subset may be detected in the image captured by the camera during this time interval (although the identities of the electronic labels from the subset may not be distinguishable in the image).

For each of the time intervals, the subset of electronic labels may include at least two electronic labels.

For each of the time intervals, there may be at least two electronic labels outside the subset of electronic labels.

The at least one position in the image corresponding to an electronic label from the subset may for example be detected in the image via image processing (e.g. via digital image processing).

According to some embodiments, the number of electronic labels may be larger than the number of time intervals (and/or the number of images) employed for determining the positions of the electronic labels in the images. For example, if N is an integer larger than 0, then N time intervals (or N images) may be employed to distinguish between $2^N$ (i.e. 2 to the power of N) distinct temporal patterns, and thereby to determine positions of up to $2^N$ electronic labels in the images.

According to some embodiments, the electronic labels in the subset may be controlled to provide optical outputs of different intensity and/or spectral composition than the other electronic labels.

For example, the electronic labels in the subset may be controlled to emit light during a time interval, while the other electronic labels may be controlled not to emit light during that time interval.

For example, the electronic labels in the subset may be controlled to emit light of a different color than the other electronic labels.

According to some embodiments, a control section (or controller) may select, for each of the time intervals, the subset of the electronic labels to be controlled to provide the distinguishable optical output. In other words, the control section may control the electronic labels to provide the distinct temporal pattern of optical changes, while the electronic labels themselves need not necessarily know which temporal patterns they are associated with (and which they are supposed to provide as output). Knowledge of the distinct temporal patterns corresponding to the respective electronic labels may for example be provided from the control section to a processing section arranged to determine the positions of the electronic labels in the images.

The centralized control of the temporal patterns provided by the present embodiments allows for use of less advanced and/or less expensive electronic labels, and facilitates modification of the temporal patterns in case some of the electronic labels are replaced or in case the number of electronic labels is increased.

According to some embodiments, information about the distinct temporal patterns of optical changes may be stored in the respective electronic labels. Controlling the electronic labels to change their respective optical outputs may include controlling the electronic labels to initiate their respective temporal patterns of optical changes. In other words, there may be no need to send control signals to the electronic labels for explicitly instructing the electronic labels when and how to provide the individual optical changes, as information about this is already stored in the electronic labels. Hence, the number of control signals transmitted to the electronic labels may be reduced.

According to some embodiments, the method may comprise determining, for at least one of the electronic labels, a position of an object associated with the electronic label in an image captured by the camera. The position of the object may be determined via computation based on the determined position of the electronic label and based on knowledge of a location of the object relative to the determined position of the electronic label. In this way, the position of the object in the image may be determined even if the object itself is not visible (or detectable) in the image, e.g. due to low image resolution or poor illumination of the object when the image was captured (or the object may be a product which is currently out of stock and is therefore not visible in the image).

A location of the object relative to the electronic label may for example be predefined, or knowledge of this relative location may for example be obtained via signaling from the electronic label. The electronic label may for example be arranged at a known (e.g. predefined) position relative to the object, such as at a certain distance above or below the object.

The position of the object may for example be determined via computation (or processing) in a processing section.

The object may for example be an object on which the electronic label is arranged, such as a fixture (e.g. a shelf or rack) or a shopping cart, or a product associated with the electronic label.

The electronic label may for example be arranged to visually convey (or display) information about the object.

According to some embodiments, the method may comprise determining, for at least one of the electronic labels, a product position for a product associated with the electronic label in an image captured by the camera. The product position may be determined via computation based on the determined position of the electronic label and based on knowledge of a location of the product position relative to the determined position of the electronic label. In this way, the product position may be determined in the image even if the product itself is not visible (or detectable) in the image, e.g. due to low image resolution or poor illumination.

Products in a retail store may be arranged at respective product positions along fixtures such as shelves, racks or other displays. The product positions may for example be selected to maximize sales by promoting certain products and/or to improve logistics of the store. Product positions for at least some products may be changed quite often and it may be difficult to maintain an updated record of the actual product positions. Knowledge of the actual product positions may for example save time when products are restocked as persons bringing new items of the products to the fixtures of the store (e.g. from a storage room, a warehouse, or a supply truck) need not search through the fixtures of the store for the correct product positions at which to arrange the new items of the respective products. It may also be important to detect low stock on the shelves as soon as possible since low stock on the shelves may lead to a lost sales opportunity for the retail store.

As the electronic labels may already be provided for other purposes, such as conveying information about the associated products to customers, the present method may require no extra devices or arrangements for determining the product position in the image captured by the camera.

The electronic labels may for example be arranged for optically conveying information about respective products, such as prices of the products.

The electronic labels may for example be arranged at respective predetermined (or predefined) positions relative to the respective associated products.

According to some embodiments, the method may comprise determining, by at least analyzing the image captured by the camera, whether there are any items of the product at the determined product position.

It may be difficult to determine, based on an image, whether a product position associated with a specific product is empty. However, if the location of that product is known in the image, then such a determination may be facilitated as an image processing device knows where to look for empty space. Further, if empty space is detected in the image, it may be determined to which of the product positions it corresponds (at least if all of the product positions along the fixture have been determined).

Empty space at a product position may for example be determined by detecting regions having different color than the expected color of items of the product associated with that product position.

Empty space at a product position may for example be determined by detecting shadows or darker regions between or in front of items arranged at a product position. Such shadows or darker region may indicate room for additional items.

Empty space at a product position may for example be detected by comparing an image captured by the camera to a reference image captured by the camera at a point in time when the product position was full of items of the product or when the product position was completely empty.

According to some embodiments, the method may comprise, in response to a determination that there are no items of the product at the product position, signaling that the product associated with the electronic label needs to be restocked. Since the signaling includes an indication of the product to be restocked, restocking may be performed sooner and/or more efficiently.

The signaling may for example be provided to a database, to a restocking system, or to person assigned to perform the restocking.

According to some embodiments, the method may comprise determining, by at least analyzing the image captured by the camera, whether there is room for more items of the product at the determined product position.

Once the product position is known in the image, an empty space (or an empty spot) in the image at that position may be considered an indication that there is room for one or more items of the product. Empty space may for example be detected as an empty space at the side of items of the product, or as an empty space in front of items of the product.

Empty space may for example be determined by analyzing colors or shadows of the image, or by comparing the image to a reference image captured by the camera at a point in time when the product position was full of items of the product.

According to some embodiments, the method may comprise, in response to a determination that there is room for more items of the product at the product position, signaling that there is room for restocking the product associated with the electronic label.

The signaling may for example comprise an estimate of how much room there is available for restocking the product, or an estimate of the number of additional items that may fit into the product position.

In some embodiments, the signaling that there is room for restocking the product may only be performed in case it is determined (or estimated) that at least a certain portion/fraction (such as one half, one third or one fourth) of the product position is empty.

According to some embodiments, the method may comprise detecting, by at least analyzing the image captured by the camera, whether any shelf talkers are arranged at one or more positions associated with the determined product position, and determining whether one or more detected shelf talkers comply with a prescribed shelf talker arrangement for the product associated with the electronic label.

Shelf talkers may be printed cards or other signs mounted at (or attached to) a fixture to bring the attention of customers to a particular product arranged at the fixture. Shelf talkers may for example include information about the associated product, such as "organic", "gluten free" or "healthy". Shelf talkers may for example include information about a special deal or sale associated with the product. Shelf talkers may for example include one or more electronic components such as light sources, displays or sound generating components.

Some products may be associated with prescribed shelf talker arrangements. For example, a manufacturer of the product or the store management may have decided that certain shelf talkers are to be arranged at prescribed positions associated with the product position. The prescribed shelf talker arrangement for a product may include positioning of shelf talkers, size and/or color of shelf talkers, and/or certain text displayed on the shelf talkers.

A position associated with the determined product position may for example be a position adjacent to the determined product position, or a predefined position relative to the determined product position (such as a certain distance above or below the product position, or at an end of the fixture at which the product position is located), or a predefined position relative to the electronic label.

The method may for example comprise signaling that one or more shelf talkers not complying with the prescribed shelf talker arrangement should be replaced or removed.

According to some embodiments, the method may comprise estimating, based on the determined product position in the image captured by the camera, a product position in a fixture, and estimating, based on the estimated product position in the fixture and based on a position and orientation of the fixture in an area, a product position in the area.

The position and orientation of the fixture in the area may for example be received from a memory or database. The position and orientation of the fixture may for example be determined manually or may be determined automatically as described further below.

The product position in the fixture may for example correspond to a portion of the fixture, such as "the third position/slot from the left on the second shelf from the top of the fixture".

According to some embodiments, products may be are arranged at respective product positions along a fixture, and electronic labels associated with the respective products may be arranged such that a product position for a product is obtainable (or computable) once a position of the associated electronic label is known. The fixture may be arranged in an area. The method may comprise estimating, based on at least some of the determined label positions in the images captured by the camera, a size, shape and position of the fixture in the images captured by the camera. The method may comprise estimating a position or orientation of the fixture in the area based on the estimated size, shape and position of the fixture in the images captured by the camera and based on knowledge of a real size and shape of the fixture.

It will be appreciated that both the position and the orientation of the fixture in the area may for example be estimated.

Knowledge of camera attributes such as position, orientation and field-of-view of the camera may for example be employed when estimating the position and/or orientation of the fixture in the area.

Positions and orientations of fixtures in a retail store may for example be visualized in a floor plan to show customers how to find their way in the store, to find a specific product on the floor plan, or to show where emergency exits or fire extinguishers are arranged. As time passes, positions and orientations of fixtures in the retail store may need to be modified, e.g. to comply with new regulations or to follow upcoming market trends. Determination of the current position and/or orientation of the fixtures in accordance with the present embodiments allows for maintaining an updated floor plan.

According to a fifth aspect, there is provided a computer program product comprising a computer-readable medium with instructions for performing the method according to any embodiment of the fourth aspect.

The advantages presented above for features of methods, according to the fourth aspect, may generally be valid for the corresponding features of computer programs products according to the fifth aspect.

The computer-readable medium may for example store or carry instructions for causing a computer to perform the method according to any embodiment of the fourth aspect.

The computer-readable medium may for example be a transitory storage medium (such as a carrier wave), or a non-transitory storage medium (such as a disc or memory storing the instructions).

According to a sixth aspect, there is provided a system for determining positions of electronic labels in images. The system is configured to (or comprises a control section configured to) control, via at least one control signal, the electronic labels to change their respective optical outputs. The changes of optical outputs of the respective electronic labels include respective distinct temporal patterns of optical changes. The system is configured to (or comprises a processing section configured to) receive a plurality of images containing the electronic labels and captured by a camera at points in time such that the distinct temporal patterns of optical changes are distinguishable in the images, detect the distinct temporal patterns of optical changes in the images by at least analyzing the images, and determine positions of the respective electronic labels in the images as positions in the images at which the corresponding distinct temporal patterns of optical changes have been detected.

The advantages presented above for features of methods, according to the fourth aspect, may generally be valid for the corresponding features of systems according to the sixth aspect.

The system may for example comprise the camera.

The system may for example comprise the electronic labels.

It is noted that embodiments of the present disclosure relate to all possible combinations of features recited in the claims. Further, it will be appreciated that the various embodiments described for the method, according to the fourth aspect, are all combinable with embodiments of the system according to the sixth aspect.

BRIEF DESCRIPTION OF THE DRAWINGS

In what follows, example embodiments will be described in greater detail and with reference to the accompanying drawings, on which.

All the figures are schematic and generally only show parts which are necessary in order to elucidate the respective embodiments, whereas other parts may be omitted or merely suggested.

DETAILED DESCRIPTION

Figure 1:
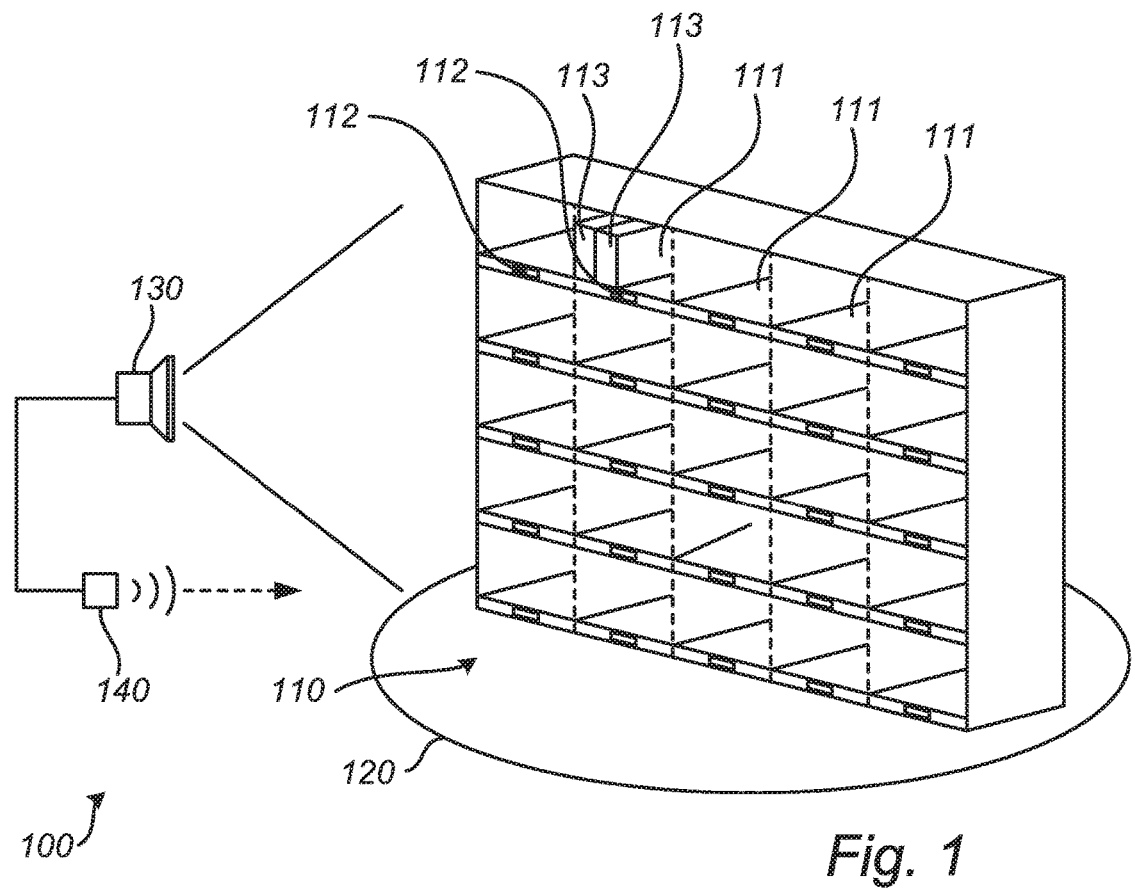
FIG. 1 is an overview of a system for analyzing an image of a fixture, according to an embodiment.

FIG. 1 is an overview of a system 100 for analyzing an image of a fixture 110, according to an embodiment.

The fixture 110 may for example be a shelf, rack or some other type of display arranged in an area 120 of a retail store.

Products are arranged at respective product positions 111 distributed along the fixture 110. Electronic labels 112 associated with the respective products are arranged such that a product position 111 for a product is obtainable (i.e. derivable or possible to determine) once a position of the associated electronic label 112 is known. The electronic labels 112 may for example be arranged at predefined positions relative to the respective associated product positions 111. The electronic labels 112 may for example be arranged above, below or at the side of the respective associated product positions 111. The electronic labels 112 may for example be arranged at predefined distances from the respective associated product positions 111.

In the example illustrated in FIG. 1, the electronic labels 112 are centered below the respective corresponding product positions 111. In another example arrangement, an electronic label 112 may be left aligned below the corresponding product position 111 such that items of the corresponding product are located above and to the right of the electronic label 112. Use of left aligned (or right aligned) electronic labels 112 may for example facilitate determination of the corresponding product positions 111 in cases where the different product positions 111 have different widths, or wherein the widths of the product positions 111 are not fixed. A product position 111 may be empty or may contain one or more items 113 of the corresponding product.

It will be appreciated that although the products positions 111 of the example fixture 110 illustrated in FIG. 1 all have the same width, other widths or shapes of the product positions 111 may be envisaged. Different product position along a shelf of the fixture 110 may for example have different widths, and product positions on different shelves of the fixture may for example have different heights.

It will also be appreciated that items 113 of different products may for example have different shapes or sizes. Different numbers of items 113 of the appropriate product may for example fit into the different product positions 111.

The products may for example be packages of food items or hygiene products, or other types of products one may find in a retail store. The products may for example be groceries or electronics.

A camera 130 is arranged to capture images of the fixture 110. The camera 130 may for example be a regular camera arranged to capture snap shots, or a video camera arranged to capture images at a certain frame rate. The camera 130 may for example be a surveillance camera.

The system 100 comprises a processing section 140 configured analyze images captured by the camera 130, and to determine the product positions 111 based on the images. Operation of the system 100 will be further described below with reference to FIGS. 1-8.

Figure 2:
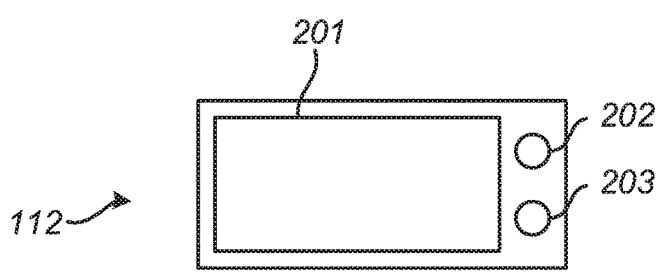
FIG. 2 shows an electronic label controllable by the system shown in FIG. 1.

FIG. 2 shows an electronic label 112 controllable by the system 100 described with reference to FIG. 1.

The electronic label 112 comprises a display (or screen) 201 arranged to convey information about a product associated with the electronic label 112. The display 201 may for example be a backlit display (e.g. a flat panel backlit display) or a display providing light output based on reflection of ambient light. The display 201 may for example be a reflective LCD display or a display based on electronic paper for proving light output, which may save power compared to use of backlit displays.

The electronic label 112 may comprise a receiver 202 arranged to receive wireless control signals indicating what to display on the screen 201. The receiver 202 may for example be arranged to receive radio-based control signals or control signals based on infrared light.

In some embodiments, the electronic label 112 may be arranged to receive wired control signals, for example via wires (or connections) provided in the fixture 110.

The electronic label 112 may for example comprise one or more light sources 203, such as light emitting diodes (LEDs).

The electronic label 112 may for example comprise an internal power supply (e.g. a battery) or may be connected to an external power source such as line power (or mains electricity).

Figure 3:
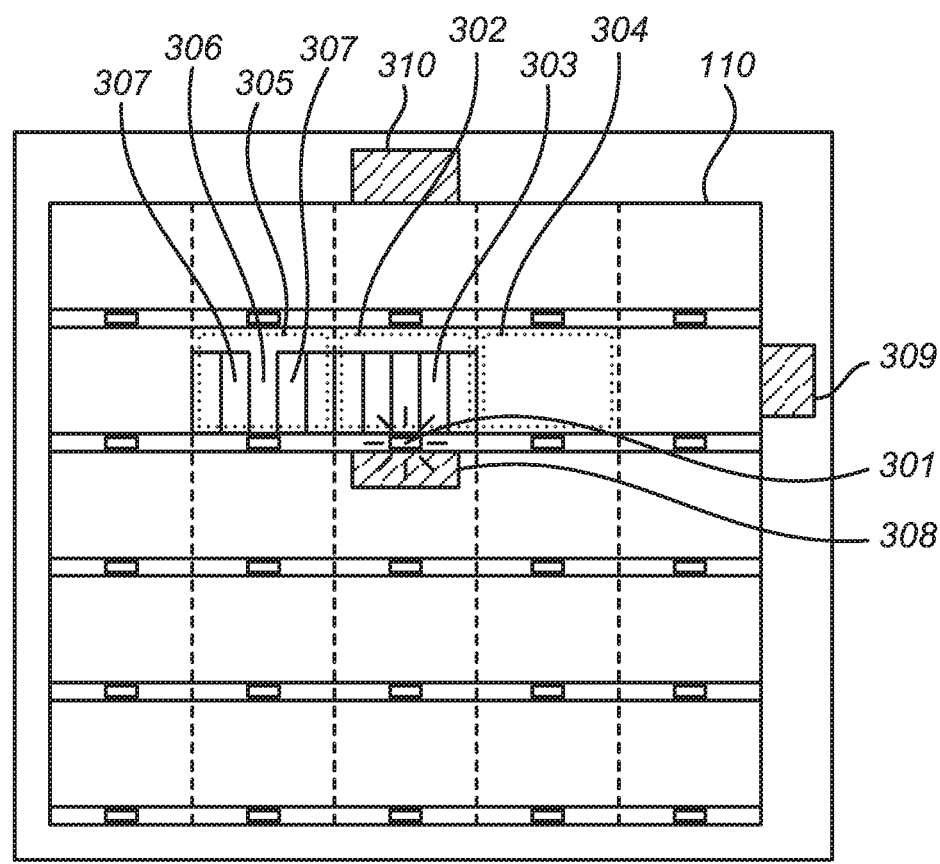
FIG. 3 shows an image of the fixture shown in FIG. 1.

FIG. 3 shows an image 300 of the fixture 110 described with reference to FIG. 1. The image 300 may for example have been captured from the front of the fixture 110 by the camera 130.

Figure 6:
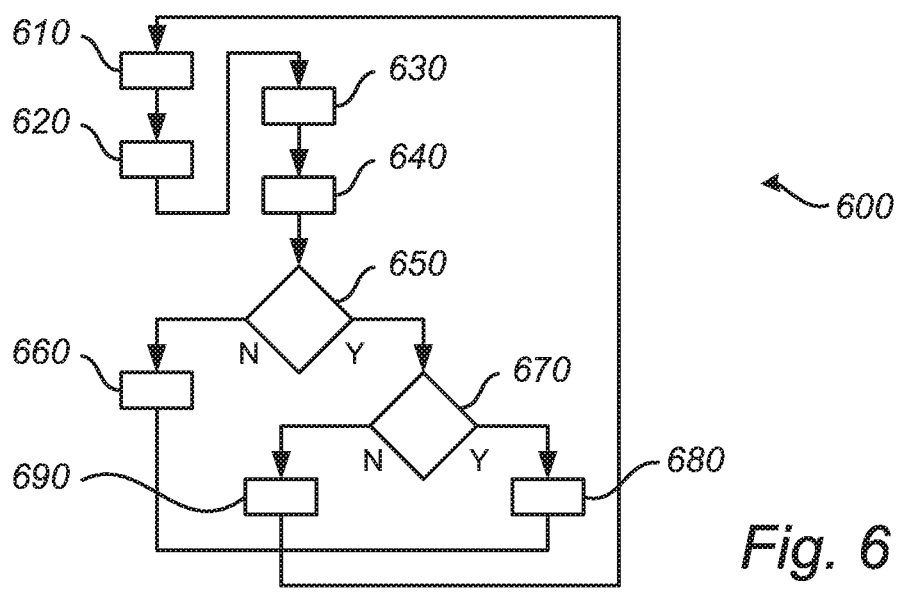
FIGS. 6-8 are flow charts of methods according to embodiments.

FIG. 6 is a flow chart of a method 600 performed by the system 100 (or by the processing section 140 of the system 100). Operation of the system 100 will now be described with reference to FIGS. 1, 2, 3 and 6.

The method 600 comprises controlling 610 one or more of the electronic labels 112 to change its optical output. The system 100 may for example comprise an output section (not shown in FIG. 1) for providing control signals to the electronic labels 112.

The control of the electronic labels 112 may for example be provided via wireless control signals to the receiver 202. The system 100 may for example comprise a wireless transmitter (not shown in FIG. 1) arranged to transmit control signals to the electronic label 112.

The control of the electronic labels 112 may for example be provided via control signals through wires or connections to the electronic labels 112.

The change of optical output may for example be provided by switching on and off the light source 203 or by switching between black and white on the display 201.

The method 600 comprises receiving 620, from the camera 130, an image 300 containing the electronic label 112 and captured after the change of optical output has been initiated.

The method 600 comprises detecting 630 a position 301 of the electronic label 112 in the image 300 based on a characteristic associated with the change of optical output.

In the present example, the image 300 was captured when the light source 203 was on, so the electronic label 112 is easily detectable in the image 300 as a bright spot 301, even in cases where the resolution of the image 300 is poor.

The method 600 comprises determining 640, based on the detected position 301, a product position 302 in the image 300 for the product associated with the electronic label.

For example, if the electronic labels 112 are always arranged just below the respective product positions 111, then the product position 302 of the product associated with the electronic label position 301 may be determined as a position above the detected label position 301 in the image 300.

The above described steps of the method 600 may for example be repeated for all electronic labels 112 of the fixture 110 so as to determine their respective positions in the image 300.

The change of optical output provided by an electronic label 112 may be provided in many different ways. The change of optical output may for example be provided by switching on the light source 203. If the light sources of the other electronic labels are kept off, then the light source 203 may be easily detected in the image 300 as a bright spot and the identity of the electronic label 112 may therefore be recognized in the image 300.

Even if electronic labels 112 may not normally be visible in images captured by the camera 130 (e.g. due to low resolution of poor light conditions), the light source 203 may be detectable when switched on.

In some cases, the electronic labels 112 may all be visible in images captured by the camera 130, but it may still be difficult to identify the individual electronic labels 112 based on these images. Switching on the light source 203 of a selected electronic label 112 allows this electronic label 112 to be identified in the images.

The processing section 140 analyzing the images captured by the camera 130 may for example look for a specific change of optical output, such as a light source 203 being switched on. Alternatively, the processing section 140 may look for an electronic label 112 which behaves differently than other electronic labels 112 visible on the images from the camera 130.

The position 301 of an electronic label 112 may be detected based on a single image or based on multiple images. If the electronic label 112 is the only one comprising an activated LED, then a single image may be sufficient to distinguish the electronic label 112. However, even an activated LED may be difficult to distinguish based on a single image. People in the store may for example temporarily block the view of the camera 130, or some parts of the fixture may appear as bright as the activated light source 203 of the electronic label 112 in a particular image. The position of the electronic label 112 may therefore be detected by analyzing a difference between before and after the change of optical output. The processing section 140 may for example receive an image captured before the change of optical output has been initiated and an image captured after the change of optical output has been initiated. By comparing these two images, the flashing of the light source 203 may be more easily detected.

If positions of multiple product positions in an image are to be determined, distinct (or unique) temporal or spatial patters of optical changes may be employed for the respective associated electronic labels 112, so that the different labels 112 may be distinguished in images captured by the camera 130. In other words, a plurality of electronic labels 112 may for example be controlled to change their respective optical outputs, wherein the changes of optical outputs of the respective electronic labels 112 include respective distinct (or unique) temporal and/or spatial patterns of optical changes.

A temporal pattern may for example be provided in the form of a unique sequence of optical changes, such as flashing of the light source 203 or of the display 201.

A spatial pattern may for example be provided by showing a certain symbol, color, image or pattern at the display 201 (e.g. at a given point in time).

A sequence of images may be captured by the camera 130 after at least one of the changes of optical outputs has been initiated. The processing section 140 may receive and analyze these images to detect positions of the respective electronic labels 112 in the images. The identities of the respective electronic labels 112 in the images may be identified via the respective distinct temporal or spatial patterns of optical changes. The product positions for the respective products associated with the respective electronic labels 112 may then be determined in the images received from the camera 130 based on the detected label positions.

Instead of employing temporal or spatial patterns, the changes of optical output of the respective electric labels 112 may for example be controlled to occur at different points in time, and the different electronic labels 112 may thereby be identified in images captured by the camera 130. In other words, the processing section 140 may control the electronic labels 112 to change their respective optical outputs at respective distinct (or unique) points in time. A sequence of images containing the electronic labels 112 and captured between the respective points in time may be captured by the camera 130. The processing section 140 may receive and analyze these images to detect positions of the respective electronic labels 112 in the images, wherein identities of the respective electronic labels 112 in the images are identified via points in time for which changes of optical outputs for the respective electronic labels in the images are detected. The product positions for the respective products associated with the respective electronic labels 112 may then be determined based on the detected positions.

It will be appreciated that although some of the above described ways to distinguish electronic labels 112 are described in terms of optical changes provided by the light source 203, the electronic labels 112 may just as well be distinguished via similar optical changed provided by the display 201.

The method 600 may for example comprise additional steps for determining whether it is time to restock the product associated with an electronic label 112.

The method 600 may comprise determining 650, by at least analyzing the image 300 received from the camera 130, whether there are any items of the product at the determined product position 302.

In the present example, there are items 303 of the product at the product position 302. However, at the next product position 304 to the right, there are no items, i.e. that product position 304 is empty.

If it is determined that there are no items of the product at the product position 302 (indicated by N in FIG. 6), the method 600 may proceed by signaling 660 that the product associated with the electronic label 301 needs to be restocked.

If it is determined that there are items of the product at the product position 302 (indicated by Y in FIG. 6), the method 600 may instead proceed by determining 670, by at least analyzing the image 300 received from the camera 130, whether there is room for more items 303 of the product at the determined product position 302.

In the present example, the product position 302 is full, and there is no room for further items 303 of the product. However, at the next product position 305 to the left, there is empty space 306 between the items 307 of the product corresponding to that product position 305.

If it is determined that there is room for more items of the product at the product position 302 (indicated by Y in FIG. 6), the method 600 may proceed by signaling 680 that there is room for restocking the product associated with the electronic label 112 (detected at position 301 in the image 300).

If it is determined that there is no room for more items of the product at the product position 302 (indicated by N in FIG. 6), the method 600 may instead proceed by signaling 690 that there is no room for restocking the product associated with the electronic label 112 (detected at position 301 in the image 300).

Embodiments may also be envisaged in which signaling 690 that there is no room for restocking is dispensed with. A person or system receiving signaling relating to the need to restock products may for example assume that there is no room for restocking a product until signaling indicating the contrary is received.

Empty space at a product position may be determined in a number of different ways.

If the resolution in the images is high enough, and the image quality is good enough, the exact number of items of the product at the product position may for example be determined if all the items are lined up next to each other in the fixture. If, on the other hand, items of a product are arranged in a row behind each other, only one of the items may be visible in the image 300.

Empty space at a product position may for example be determined by detecting regions with different color than the expected color of items of the product associated with that product position. The fixture 110 may for example be painted in a particular color which is easily distinguishable in the image 300, so that gaps or empty space between items may be detected in the image 300. Alternatively or additionally, certain easily distinguishable objects or marker or screens may be placed behind the items of the product when the items are placed at the fixture so that these objects, markers of screens become visible when the items are removed from the fixture by customers.

Empty space at a product position may for example be determined by detecting shadows or darker regions between or in front of items arranged at a product position. Such shadows or darker region may indicate room for additional items.

Empty space at a product position may for example be detected by comparing an image captured by the camera 130 to a reference image captured by the camera 130 at a point in time when the product position was full of items of the product or to a reference image captured by the camera 130 at a point in time when the product position had no items (i.e. when the product position was empty).

The step of determining 670 whether there is room for more items 303 of the product at the determined product position 302 may for example include estimating whether there is room for at least a predefined number of more items 303 of the product at the product position 302, and/or estimating how much room is available at the product position 302.

The step of signaling 680 that there is room for restocking the product associated with the electronic label may for example include signaling that there is room for at least the predefined number of items of the product associated with the electronic label and/or signaling an estimate of how much room is available for restocking the product.

It may for example be desirable to keep the number of items of each product above a certain level to improve customer's impression of the store.

It may for example be desirable to restock a product by bringing a certain number of items of the product at a time, rather than bringing one or two items of the product to the product position as soon as a few items have been sold. This may save time and/or facilitate logistics.

The analysis performed by the processing section 140 may be difficult or susceptible to errors in case the image resolution is low, optical conditions in the image are poor, or the view of the camera has been shadowed/obscured by persons in the store. The reliability of the analysis performed by the processing section 140 may be increased by increasing the number of images included in the analysis, and/or employing multiple cameras to capture images from different angles.

The processing section 140 may for example be configured to detect when its analysis may be uncertain (e.g. by checking the number of available images, the resolution of the images, and/or the optical conditions of the images) and may provide signaling indicating whether the uncertainty is estimated as high or low.

Figure 7:
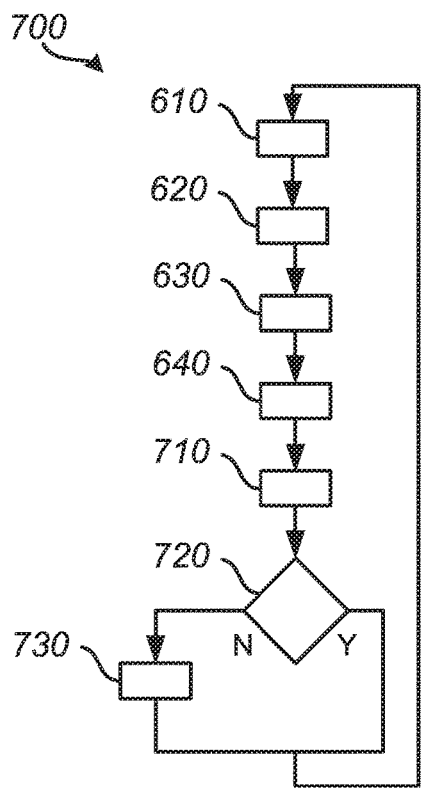

FIG. 7 is a flow chart of a method 700 performed by the system 100 (or by the analyzing section 140 of the system 100). Similarly to the method 600 described with reference to FIG. 6, the method 700 comprises controlling 610 the electronic label 112, receiving 620 the image 300, detecting 630 the label position 301 in the image 300, and determining 640 the product position 302 in the image 300.

The method 700 further comprises detecting 710, by at least analyzing the image 300 received from the camera 130, whether any shelf talkers are arranged at one or more positions associated with the determined product position 302.

Shelf talkers may be printed cards or other signs mounted at (or attached to) the fixture 110 to bring the attention of customers to a particular product arranged at the fixture 110. Shelf talkers may for example include information about the associated product, such as "organic", "gluten free" or "healthy". Shelf talkers may for example include information about a special deal or sale associated with the product.

Some products may be associated with prescribed shelf talker arrangements. For example, a manufacturer of the product or the management of the retail store may have decided that certain shelf talkers are to be arranged at prescribed positions associated with the product position 302. The prescribed shelf talker arrangement for a product may include positioning of shelf talkers, size and/or color of shelf talkers, and/or certain text displayed on the shelf talkers.

In the present example, a first shelf talker 308 is arranged just below the product position 302, a second shelf talker 309 is arranged at an end of the fixture 110 at the same height as the product position 302, and a third shelf talker 310 is arranged on top of the fixture above the product position 302.

The method 700 comprises determining 720 whether one or more detected shelf talkers 308-310 comply with a prescribed shelf talker arrangement for the product associated with the detected electronic label 301 in the image 300.

If the prescribed shelf talker arrangement is not complied with (indicated by N in FIG. 7), the method 700 may proceed by signaling 730 that a shelf talker arrangement for the product needs to be adjusted. The signaling may for example include information about what may be wrong with the current shelf talker arrangement, such as a missing shelf talker, an incorrect position of a shelf talker, or the wrong shelf talker being used in connection with a product.

If the prescribed shelf talker arrangement is complied with (indicated by Y in FIG. 7), no signaling may for example be needed.

Figure 8:
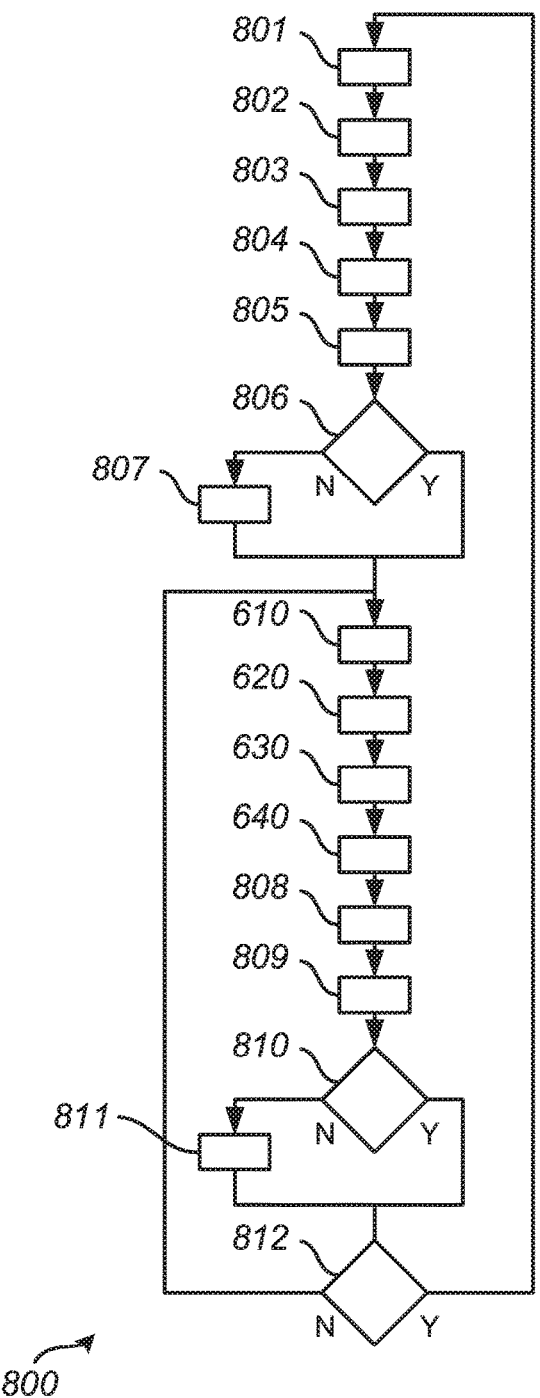

FIG. 8 is a flow chart of a method 800 for estimating real-world positions of products, i.e. positions of products in an area 120 of a retail store in which the fixture 110 is arranged.

Similarly to the method 600 described with reference to FIG. 6, the method 800 comprises controlling 610 the electronic label 112, receiving 620 the image 300, detecting 630 the label position 301 in the image 300, and determining 640 the product position 302 in the image 300.

The method 800 comprises estimating 808, based on the determined product position 302 in the image, a product position in the fixture 110 (e.g. a product position along the fixture 110). A product position in the fixture 110 may for example be expressed as: on the third shelf out of five counted from below, with equal distances to the left and right ends of the fixture 110.

The method 800 comprises estimating 809, based on the estimated product position in the fixture 110 and based on a position and orientation of the fixture 110 in the area 120 of the retail store, a product position in the area 120 of the retail store.

The position and orientation of the fixture 110 in the area 120 may have been entered manually in a database when the store was designed or the last time the fixture 110 was moved, or may have been entered automatically during a method for automatically determining positions and orientations of fixtures in the store.

Once the position and orientation of the fixture 110 is known, a product position in the fixture such as "on the third shelf out of five counted from below, with equal distances to the left and right ends of the fixture 110" may be converted into a real-world position, e.g. in the form Cartesian coordinates such as X, Y and Z coordinates in a coordinate system of the retail store.

The method 800 may for example include steps for estimating the position and orientation of the fixture 110 using the electronic labels 112. The estimated position and orientation of the fixture 110 may then be employed in the step of estimating 809 a product position in the area 120 of the retail store.

Similarly to the method 600, described with reference to FIG. 6, the method 800 may comprise controlling 801 the electronic labels 112 to change their optical outputs, receiving 802, from the camera 130, one or more images containing the electronic labels 112 and captured after the changes of optical outputs have been initiated, and detecting 803 positions of the electronic labels 112 in the image2.

The method 800 may further comprise estimating 804, based on the detected label positions, a size, shape and position of the fixture 110 in the images.

Even if the boundaries of the fixture 110 may be difficult to distinguish in the images, the electronic labels are distributed along the fixture 110 and the label positions therefore give an indication of the size, shape and position of the fixture 110 in the images. This is illustrated in FIGS. 4 and 5.

Figure 4:
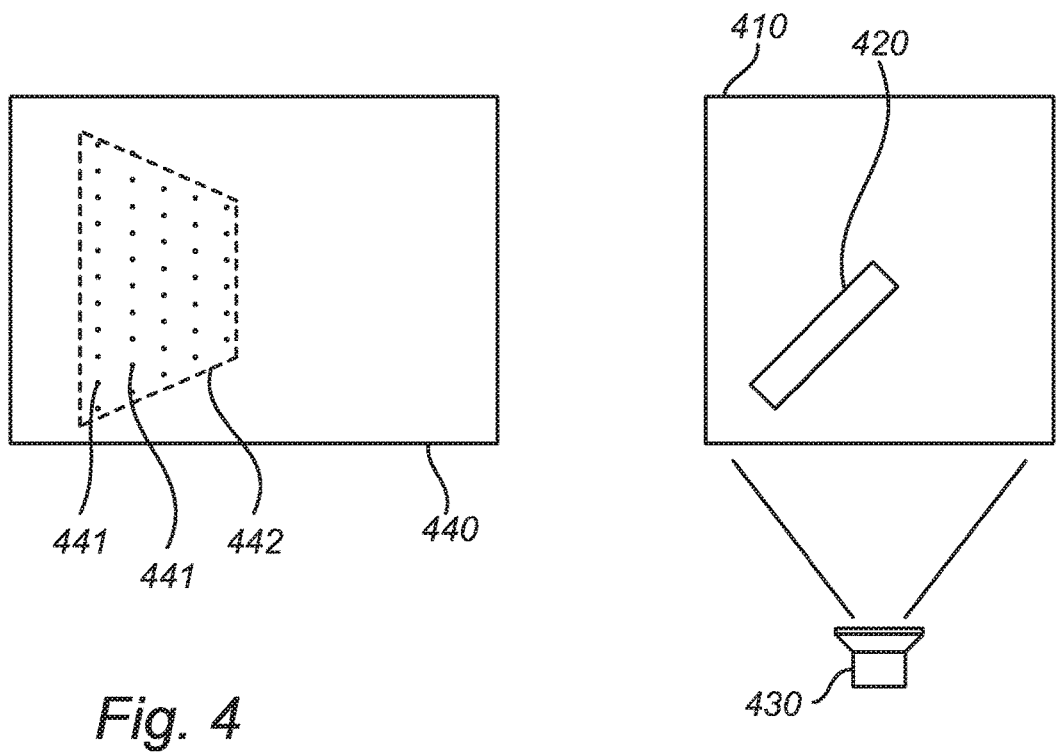
FIG. 4 shows positions of electronic labels in an image of a fixture, and an associated position and orientation of the fixture.

The right hand side of FIG. 4 is a top view of an area 410 in which a fixture 420 is arranged, wherein a camera 430 captures images of the fixture 420.

An image 440 captured by the camera 430 is shown on the left hand side of FIG. 4. As indicated in the image 440, detected label positions 441 may be employed to estimate a contour 442 of the fixture 420 in the image 440, i.e. a size, shape and position of the fixture 420 in the image 440 may be estimated. If the real size and shape of the fixture 420 is known, and camera attributes such as position, orientation and field of view of the camera 430 are known, the position and orientation of the fixture 420 in the area 410 may be estimated based on the contour 442. For example, the shape of the contour 442 indicates that the fixture 420 is arranged at an angle relative to the camera 430.

Figure 5:
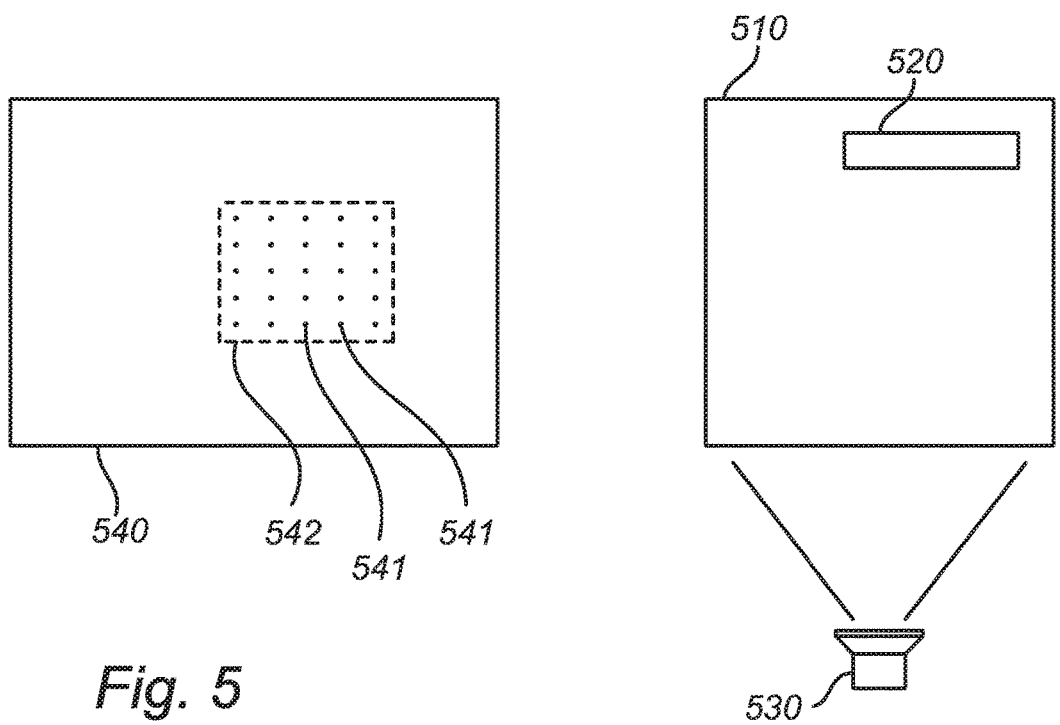
FIG. 5 shows positions of electronic labels in an image of a fixture, and an associated position and orientation of the fixture.

The right hand side of FIG. 5 is a top view of an area 510 in which a fixture 520 is arranged, wherein a camera 530 captures images of the fixture 520. In the present example, the respective areas 410 and 510, fixtures 420 and 520, and cameras 430 and 530 described with reference to FIGS. 4 and 5 are identical, but the position and orientation of the fixtures 420 and 520 in the areas 410 and 510 are different.

An image 540 captured by the camera 530 is shown on the left hand side of FIG. 5. As indicated in the image 540, detected label positions 541 may be employed to estimate a contour 542 of the fixture 420 in the image 540, i.e. a size, shape and position of the fixture 520 in the image 540 may be estimated. If the real size and shape of the fixture 520 is known, and camera attributes such as position, orientation and field of view of the camera 530 are known, the position and orientation of the fixture 520 in the area 510 may be estimated based on the contour 542.

As indicated by the respective contours 442 and 542, the size of the fixture 520 as it appears in the image 540 is smaller than the size of the fixture 420 as it appears in the image 440, which indicates that the fixture 520 is located further away from the camera 530 than the distance from the fixture 420 to the camera 430.

It will be appreciated that the label positions 441 and 541 in FIGS. 4 and 4 serve to illustrate that the contours 442 and 542 may be estimated, and that the particular label positions 441 and 541 shown in FIGS. 4 and 5 may not match the exact label positions obtained by analyzing images of a real fixture.

The method 800 may comprise estimating 805 the position and orientation of the fixture 110 based on the estimated size, shape and position of the fixture in the images (e.g. based on an estimated contour such as the contours 442, 542 described with reference to FIGS. 4 and 5) and based on knowledge of a real size and shape of the fixture 110.

The method 800 may for example comprise determining 806 whether the obtained estimates of the position and orientation of the fixture 110 in the area 120 agree with previously obtained estimates.

If the obtained estimates agree with the previously obtained estimates (indicated by Y in FIG. 8), the method 800 may proceed to the step of controlling 610 the electronic label 112.

If at least one of the obtained estimates does not agree with previously obtained estimates (indicated by N in FIG. 8), the method 800 may proceed by updating 807 the shape and/or orientation of the fixture 110 in a database or in a map of the retail store in which the fixture 110 is arranged. The method 600 may then proceed to the step of controlling 610 the electronic label 200.

After the step of estimating 809 a product position in the area 120 of the retail store, the method 800 may for example proceed by determining 810 whether the obtained estimate agrees with a previously obtained estimate.

If the obtained estimate does not agree with previously obtained estimate (indicated by N in FIG. 8), the method 800 may proceed by updating 811 the estimated product position in a database or in a map of the retail store in which the fixture is arranged.

Estimation of the product positions may for example be performed more often than the estimation of the position and orientation of the fixture 110.

Estimation of the position and orientation of the fixture 110 may for example be performed once a week or once a month, while the estimation of the product positions may for example be performed one or more times a day.

The method 800 may for example include a step 812 where it is determined whether a certain time has passed since the latest estimation of the position and orientation of the fixture 110. If yes (indicated by Y in FIG. 8), the method restarts from the beginning at step 801 for estimating a position and orientation of the fixture 110. If no (indicated by N in FIG. 8) the method 800 instead restarts at step 610 for estimating a product position.

The estimates obtained via the method 800 (i.e. the estimated fixture position and orientation, and the estimated product positions) may for example be employed for keeping an up to date map over (or floor plan of) an area 120 in which the fixture 110 is arranged, or over a retail store including the area 120. The map may for example be displayed to customers or may be employed by employees of the retail store for restocking products. The map may also be employed for analyzing and optimizing product placement and logistics of the retail store in which the fixture is arranged 110.

Figure 9:
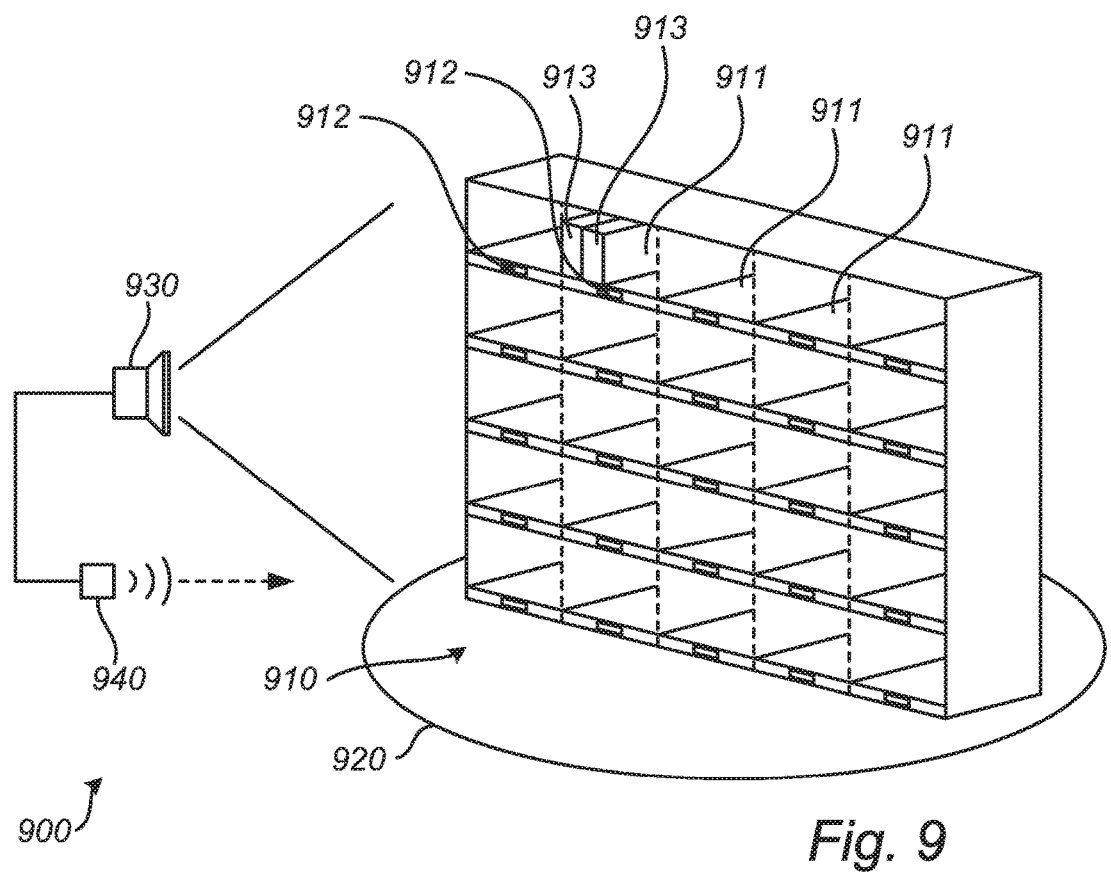
FIG. 9 is an overview of a system for determining positions of electronic labels in images, according to an embodiment.

FIG. 9 is an overview of a system 900 for determining positions of electronic labels 912 in images, according to an embodiment.

Products are arranged at respective product positions 911 distributed along a fixture 910. The fixture 910 may for example be a shelf, rack or some other type of display arranged in an area 920 of a retail store.

Electronic labels 912 associated with the respective products are arranged such that a product position 911 for a product is obtainable (i.e. computable, derivable or possible to determine) once a position of the associated electronic label 912 is known. The electronic labels 912 may for example be arranged at predefined positions relative to the respective associated product positions 911. The electronic labels 912 may for example be arranged above, below or at the side of the respective associated product positions 911. The electronic labels 912 may for example be arranged at predefined distances from the respective associated product positions 911.

In the example illustrated in FIG. 9, the electronic labels 912 are centered below the respective corresponding product positions 911. In another example arrangement, an electronic label 912 may be left aligned below the corresponding product position 911 such that items of the corresponding product are located above and to the right of the electronic label 912. Use of left aligned (or right aligned) electronic labels 912 may for example facilitate determination of the corresponding product positions 911 in cases where the different product positions 911 have different widths, or wherein the widths of the product positions 911 are not fixed. A product position 911 may be empty or may contain one or more items 913 of the corresponding product.

It will be appreciated that although the products positions 911 of the example fixture 910 illustrated in FIG. 9 all have the same width, other widths or shapes of the product positions 911 may be envisaged. Different product position along a shelf of the fixture 910 may for example have different widths, and product positions on different shelves of the fixture may for example have different heights.

It will also be appreciated that items 913 of different products may for example have different shapes or sizes.

Different numbers of items 913 of the appropriate product may for example fit into the different product positions 911.

The products may for example be packages of food items or hygiene products, or other types of products one may find in a retail store. The products may for example be groceries or electronics.

A camera 930 is arranged to capture images (e.g. digital images) of the fixture 910. The camera 930 may for example be a regular camera arranged to capture snap shots, or a video camera arranged to capture images at a certain frame rate. The camera 930 may for example be a surveillance camera.

The system 900 comprises a processing section 940 configured analyze (or process) images captured by the camera 930, and to determine the positions of the electronic labels 912 in the images. Operation of the system 900 will be further described below with reference to FIGS. 9-17.

Figure 10:
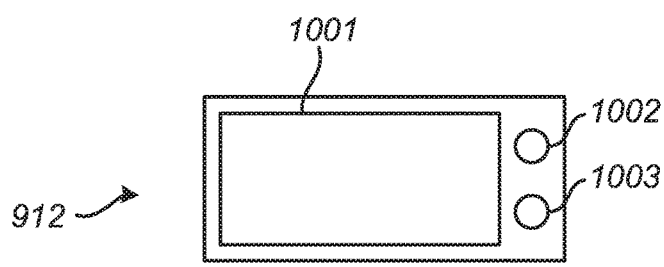
FIG. 10 shows an electronic label controllable by the system shown in FIG. 9.

FIG. 10 shows an electronic label 912 controllable by the system 900 described with reference to FIG. 9.

The electronic label 912 comprises a display (or screen) 1001 arranged to convey information about a product associated with the electronic label 912. The display 1001 may for example be a backlit display (e.g. a flat panel backlit display) or a display providing light output based on reflection of ambient light. The display 1001 may for example be a reflective LCD display or a display based on electronic paper for proving light output, which may save power compared to use of backlit displays.

The electronic label 912 may comprise a receiver 1002 arranged to receive wireless control signals indicating what to display on the screen 1001. The receiver 1002 may for example be arranged to receive radio-based control signals or control signals based on infrared light.

In some embodiments, the electronic label 912 may be arranged to receive wired control signals, for example via wires (or connections) provided in the fixture 910.

The electronic label 912 may for example comprise one or more light sources 1003, such as light emitting diodes (LEDs).

The electronic label 912 may for example comprise an internal power supply (e.g. a battery) or may be connected to an external power source such as line power (or mains electricity).

Figure 11:
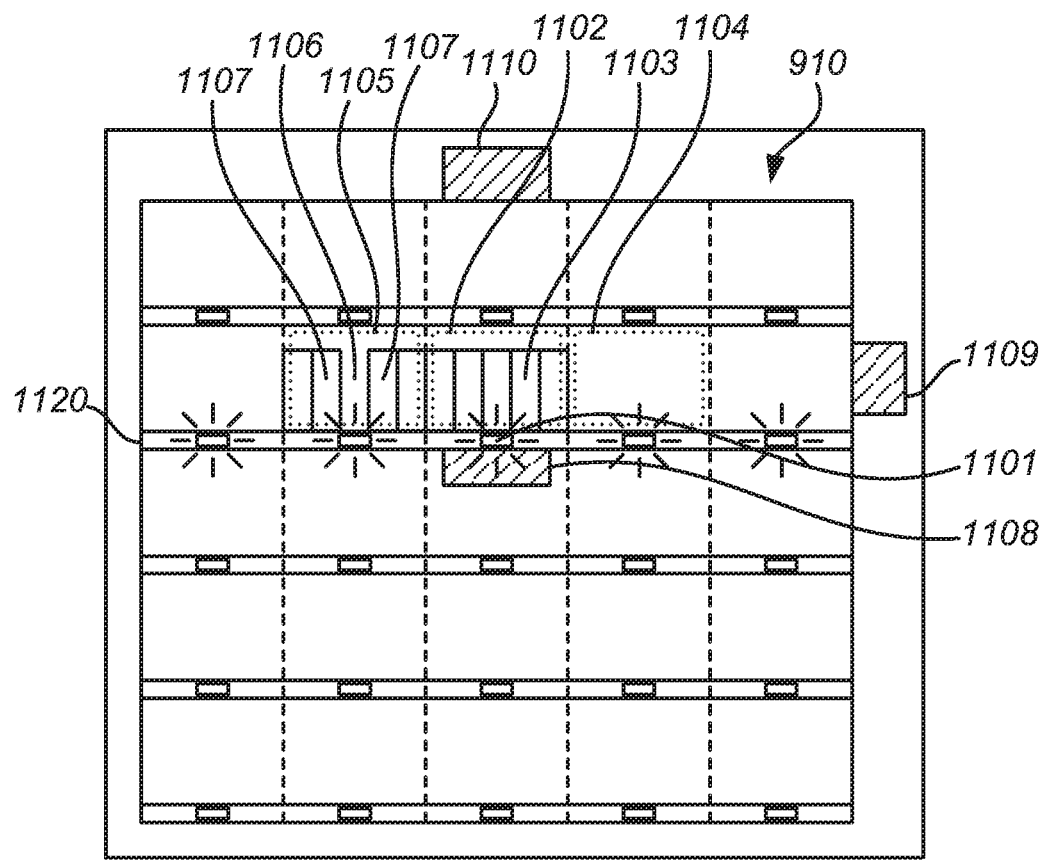
FIG. 11 shows an image of a fixture along which electronic labels are arranged.

FIG. 11 shows an image 1100 of the fixture 910 described with reference to FIG. 9. The image 1100 may for example have been captured from the front of the fixture 910 by the camera 930.

Figure 14:
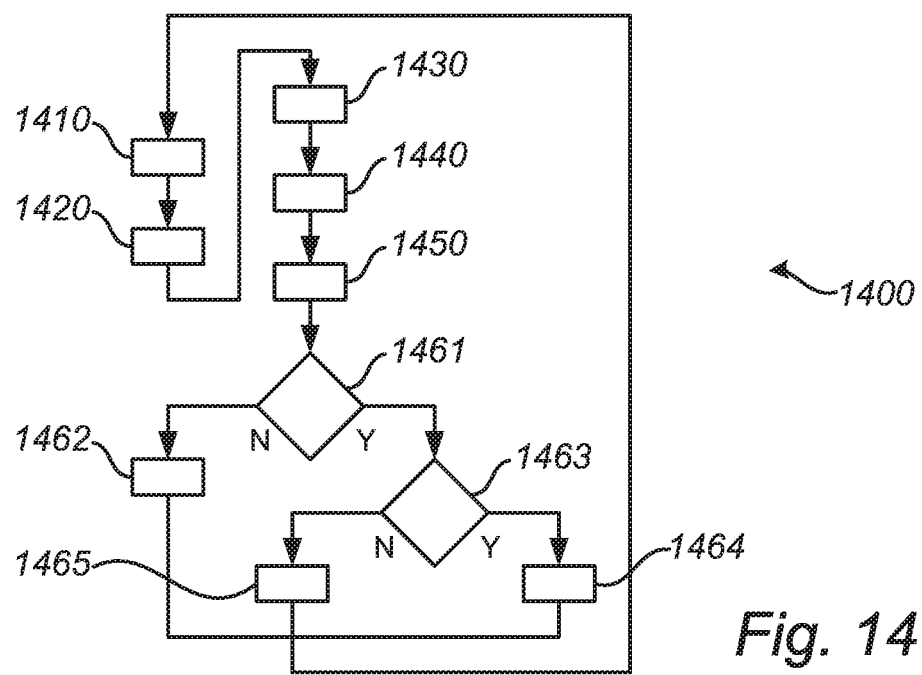
FIGS. 14-17 are flow charts of methods according to embodiments.

FIG. 14 is a flow chart of a method 1400 performed by the system 900 (or by one or more components of the system 900). This method 1400 will now be described with reference to FIGS. 9, 10, 11 and 14. The method 1400 comprises controlling 1410, via at least one control signal, the electronic labels 912 to change their respective optical outputs, such that the changes of optical outputs of the respective electronic labels 912 include respective distinct temporal patterns of optical changes. The system 900 may for example comprise an output section or control section (not shown in FIG. 9) for providing control signals to the electronic labels 912.

The control of the electronic labels 912 may for example be provided via wireless control signals to the receivers 1002 of the respective electronic labels 912. The system 900 may for example comprise a wireless transmitter (not shown in FIG. 9) arranged to transmit control signals to the electronic labels 912.

The control of the electronic labels 912 may for example be provided via control signals through wires or wired connections to the electronic labels 912.

The temporal patterns of optical changes may for example be provided by switching on and off the light sources 1003 or by switching between black and white on the displays 1001 of the electronic labels 912 according to different sequences (or according to a unique sequence for each electronic label 912).

The method 1400 comprises receiving 1420 a plurality of images containing the electronic labels 912 (or containing at least some of the electronic labels 912) and captured by the camera 930 at points in time such that the distinct temporal patterns of optical changes are distinguishable in the images. At least some of the images have been captured after at least one of the changes of optical outputs has been initiated.

The method 1400 comprises detecting 1430 the distinct temporal patterns of optical changes in the images by at least analyzing the images.

The images may for example be analyzed by a processing section 940 of the system 900 (for example via image processing, such as digital image processing).

In the present example, the image 1100 was captured by the camera 930 when the light sources 1003 were on for all electronic labels 912 arranged along the second shelf 1120 from the top of the fixture 910. These electronic labels 912 are therefore easily detectable in the image 1100 as bright spots 1101, even in cases where the resolution of the image 1100 is poor.

In images captured by the camera 930 at other points in time, light sources 1003 of other electronic labels 912 may be on, such that these electronic labels 912 may be detected in the images. By analyzing (or processing) a sufficient number of images captured at different points in time, the distinct temporal patterns associated with the respective electronic labels 912 may be detected in the images.

The method 1400 comprises determining 1440 positions of the respective electronic labels 912 in the images as positions in the images at which the corresponding distinct temporal patterns of optical changes have been detected.

The temporal patterns of optical changes provided by the electronic labels 912 may be provided in many different ways. The optical changes may for example be provided by switching on and off the light source 1003 (or switching between different colors). Even if electronic labels 912 may not normally be visible in images captured by the camera 930 (e.g. due to low resolution of poor light conditions), the light sources 1003 may be detectable when switched on.

In some cases, the electronic labels 912 may all be visible in images captured by the camera 930, but it may still be difficult to identify the individual electronic labels 912 based on these images. Switching on and off the light sources 1003 according to distinct (or unique) temporal patterns allows the electronic labels 912 to be identified in the images.

The processing section 940 analyzing (or processing) the images captured by the camera 930 may for example search for specific changes of optical output, such as light sources 1003 being switched on. Alternatively, the processing section 940 may search for electronic labels 912 which behave differently than other electronic labels 912 visible on the images from the camera 930.

A single image may sometimes be sufficient to distinguish an activated LED of an electronic label 912. However, even an activated LED may be difficult to distinguish based on a single image. People in the store may for example temporarily block the view of the camera 930, or some parts of the fixture may appear as bright as the activated light source 1003 of the electronic label 912 in a particular image. A redundant set of images (or more images than the minimum number of images required) may therefore be employed for determining the positions of the electronic labels 912 in the images captured by the camera 930. It will be appreciated that although some of the above described ways to distinguish electronic labels 912 are described in terms of optical changes provided by the light source 1003, the electronic labels 912 may just as well be distinguished via similar optical changed provided by the display 1001.

The above described steps of detecting 1430 the distinct temporal patterns of optical changes and determining 1440 positions of the respective electronic labels 912 in the images may be described as detecting positions of the respective electronic labels 912 in the images by at least analyzing the images, wherein identities of the respective electronic labels 912 in the images are identified via the respective distinct temporal patterns of optical changes.

The method 1400 may for example comprise the optional step of determining 1450, for at least one of the electronic labels 912 (or for each of the electronic labels 912), a product position 1102 in the image 1100 for the product associated with the electronic label 912. The product position 1102 is determined via computation based on the determined position 1101 of the electronic label 912 (in the image 1100) and based on knowledge of a location of the product position 1102 relative to the determined position of the electronic label 912.

For example, if the electronic labels 912 are always arranged just below the respective product positions 1102, then the product position 1102 of the product associated with the electronic label position 1101 may be determined (or computed) as a position above the detected label position 1101 in the image 1100, even if the product position 1102 itself is not distinguishable (or detectable) in the image 1100.

The product position 1102 may for example be computed by the processing section 940. This computation may for example be performed without analyzing or processing the image 1100. The method 1400 may for example comprise additional steps for determining whether it is time to restock the product associated with an electronic label 912.

The method 1400 may comprise determining 1461 by at least analyzing the image 1100 received from the camera 930, whether there are any items of the product at the determined product position 1102.

In the present example, there are items 1103 of the product at the product position 1102. However, at the next product position 1104 to the right, there are no items, i.e. that product position 1104 is empty.

If it is determined that there are no items of the product at the product position 1102 (indicated by N in FIG. 14), the method 1400 may proceed by signaling 1462 that the product associated with the electronic label 1101 needs to be restocked.

If it is determined that there are items of the product at the product position 1102 (indicated by Y in FIG. 14), the method 1400 may instead proceed by determining 1463, by at least analyzing the image 1100 received from the camera 930, whether there is room for more items 1103 of the product at the determined product position 1102.

In the present example, the product position 1102 is full, and there is no room for further items 1103 of the product. However, at the next product position 1105 to the left, there is empty space 1106 between the items 1107 of the product corresponding to that product position 1105.

If it is determined that there is room for more items of the product at the product position 1102 (indicated by Y in FIG. 14), the method 1400 may proceed by signaling 1464 that there is room for restocking the product associated with the electronic label 912 (i.e. the electronic label 912 detected at the position 1101 in the image 1100).

If it is determined that there is no room for more items of the product at the product position 1102 (indicated by N in FIG. 14), the method 1400 may instead proceed by signaling 1465 that there is no room for restocking the product associated with the electronic label 912 (i.e. the electronic label 912 detected at the position 1101 in the image 1100).

Embodiments may also be envisaged in which signaling 1465 that there is no room for restocking is dispensed with. A person or system receiving signaling relating to the need to restock products may for example assume that there is no room for restocking a product until signaling indicating the contrary is received.

Empty space at a product position may be determined in a number of different ways.

If the resolution in the images is high enough, and the image quality is good enough, the exact number of items of the product at the product position may for example be determined if all the items are lined up next to each other in the fixture. If, on the other hand, items of a product are arranged in a row behind each other, only one of the items may be visible in the image 1100.

Empty space at a product position may for example be determined by detecting regions with different color than the expected color of items of the product associated with that product position. The fixture 910 may for example be painted in a particular color which is easily distinguishable in the image 1100, so that gaps or empty space between items may be detected in the image 1100. Alternatively or additionally, certain easily distinguishable objects or marker or screens may be placed behind the items of the product when the items are placed at the fixture so that these objects, markers of screens become visible when the items are removed from the fixture by customers.

Empty space at a product position may for example be determined by detecting shadows or darker regions between or in front of items arranged at a product position. Such shadows or darker region may indicate room for additional items.

Empty space at a product position may for example be detected by comparing an image captured by the camera 930 to a reference image captured by the camera 930 at a point in time when the product position was full of items of the product, or to a reference image captured by the camera 930 at a point in time when the product position had no items (i.e. when the product position was empty).

The step of determining 1463 whether there is room for more items 1103 of the product at the determined product position 1102 may for example include estimating whether there is room for at least a predefined number of more items 1103 of the product at the product position 1102, and/or estimating how much room is available at the product position 1102.

The step of signaling 1464 that there is room for restocking the product associated with the electronic label may for example include signaling that there is room for at least the predefined number of items of the product associated with the electronic label and/or signaling an estimate of how much room is available for restocking the product.

It may for example be desirable to keep the number of items of each product above a certain level to improve customer's impression of the store.

It may for example be desirable to restock a product by bringing a certain number of items of the product at a time, rather than bringing one or two items of the product to the product position as soon as a few items have been sold. This may save time and/or facilitate logistics.

The analysis (or image processing) performed by the processing section 940 may be difficult or susceptible to errors in case the image resolution is low, optical conditions in the image are poor, or the view of the camera has been shadowed/obscured by persons in the store. The reliability of the analysis performed by the processing section 940 may be increased by increasing the number of images included in the analysis, and/or by employing multiple cameras to capture images from different angles.

The processing section 940 may for example be configured to detect when its analysis may be uncertain (e.g. by checking the number of available images, the resolution of the images, and/or the optical conditions of the images) and may provide signaling indicating whether the uncertainty is estimated as high or low.

Figure 17:
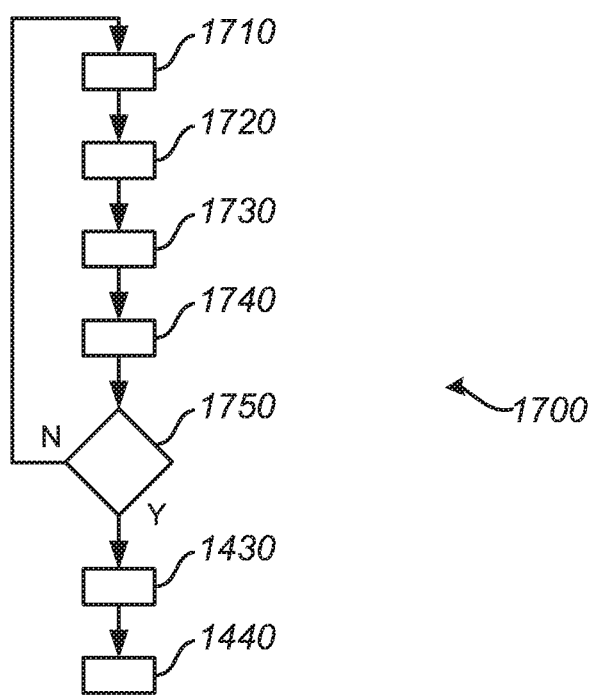

FIG. 17 is a flow chart of a method 1700 performed by the system 900 (or by one or more components therein). For each of a plurality of time intervals, the method comprises the following steps.

The method 1700 comprises controlling 1720 a subset of the electronic labels 912 to provide optical outputs distinguishing the electronic labels 912 in the subset from the other electronic labels 912.

The subset of electronic labels 912 may for example provide optical outputs of a different intensity than the other electronic labels 912 during the time interval. For example, the light sources 1003 of the electronic labels 912 in the subset may be on while the light sources 1003 of the other electronic labels 912 may be off.

The subset of electronic labels 912 may for example provide optical outputs of a different spectral composition (such as a different color) than the other electronic labels 912.

The method 1700 comprises receiving 1730 an image containing the electronic labels 912 and captured by the camera 930 during the time interval.

The method 1700 comprises detecting 1740, by at least analyzing the image, at least one position in the image corresponding to a position of an electronic label 912 from the subset, These steps are repeated for each of the time intervals. This is indicated in FIG. 17 by the decision box 1750.

If all of the time intervals have not yet passed (indicated by N in FIG. 14), the method 1700 returns to complete the above described steps for a new time interval.

Different subsets of the electronic labels 912 are controlled to provide the distinguishable optical outputs for different time intervals, such that the distinct temporal patterns of optical changes are provided by the respective electronic labels 912. In other words, the control 1720 of different subsets of electronic labels in the respective time intervals corresponds to the step of controlling 1410 the electronic labels 912 to provide the distinct temporal patterns, in the method 1400 described with reference to FIG. 14.

The images received 930 during the respective time intervals correspond to the step of receiving 1420 a plurality images, in the method 1400 described with reference to FIG. 14.

Once the above described steps have been repeated for all of the time intervals (indicated by Y in FIG. 17), the distinct temporal patterns of optical changes are detected 1430 in the images based on the positions detected 1740 in the respective images.

Similarly to the method 1400, described with reference to FIG. 14, the method 1700 continues by determining 1440 positions of the respective electronic labels 912 in the images as positions in the images at which the corresponding distinct temporal patterns of optical changes have been detected.

There may for example be $2^N$ electronic labels 912, where N is an integer larger than 0. Each electronic label 912 may for example be associated with a unique binary identity consisting of N bits (each bit being either 0 or 1). The distinct temporal patterns of optical changes may be provided by the electronic labels 912 by flashing their respective light sources 1003 on and off according to their respective binary identities. For example, in time interval number k, all electronic labels 912 having 1 at bit number k in their binary identity keeps their light source 1003 on, while all electronic labels 912 having 0 at bit number k in their binary identity keeps their light source 1003 off. In this way, N time intervals (with at least one image captured per time interval) are sufficient for detecting the distinct temporal patterns (or binary identities) in the images. Hence, positions of a large number of electronic labels ($2^N$) may be determined in a relatively short time (N time intervals).

In some embodiments, knowledge of the distinct temporal patterns of optical changes is stored in the respective electronic labels 912, and the electronic labels 912 are simply controlled by the system 900 to initiate these temporal patterns. In such embodiments, the electronic labels 912 may provide the temporal patterns without further signaling from the system 900.

In other embodiments, the binary identities of the electronic labels 912 are stored in the system 900 (for example in a central location of the system 900, such as in a control section), and the electronic labels 912 may be unaware of their respective binary identities. In such embodiments, the method 1700 may comprise the step of selecting 1710, for each of the time intervals, the subset of electronic labels 912 to be controlled to provide the distinguishable optical output. In the case of binary identities, a control section of the system 900 may for example select which electronic labels 912 to keep their light sources 1003 active (or on) during the different time intervals. In other words, control signals may be sent to the electronic labels 912 for each of the time intervals, since the electronic labels 912 may not be able to determine themselves whether or not to keep the light source 1003 on during a given time interval.

Figure 15:
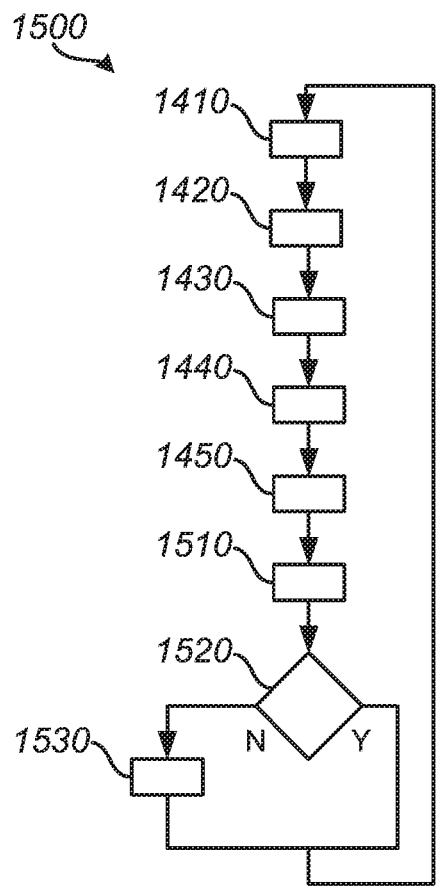

It will be appreciated that the distinct temporal patterns of optical changes may be provided in many other ways than flashing of the light sources 1003 (for example by switching between different colors on the displays 1001), and that the distinct temporal patterns of optical changed may be stored or represented in other forms than as binary identities of the electronic labels 912. FIG. 15 is a flow chart of a method 1500 performed by the system 900 (or by one or more components therein). Similarly to the method 1400 described with reference to FIG. 14, the method 1500 comprises controlling 1410 the electronic labels 912, receiving 1420 the images captured by the camera 930, detecting 1430 the distinct temporal patterns of optical changes in the images, determining 1440 the positions 1101 of the electronic labels 912 in the images, and determining 1450 at least one product position 1102 in the image 1100.

The method 1500 further comprises detecting 1510, by at least analyzing the image 1100 received from the camera 930, whether any shelf talkers are arranged at one or more positions associated with the determined product position 1102.

Shelf talkers may be printed cards or other signs mounted at (or attached to) the fixture 910 to bring the attention of customers to a particular product arranged at the fixture 910. Shelf talkers may for example include information about the associated product, such as "organic", "gluten free" or "healthy". Shelf talkers may for example include information about a special deal or sale associated with the product.

Some products may be associated with prescribed shelf talker arrangements. For example, a manufacturer of the product or the management of the retail store may have decided that certain shelf talkers are to be arranged at prescribed positions associated with the product position 1102. The prescribed shelf talker arrangement for a product may include positioning of shelf talkers, size and/or color of shelf talkers, and/or certain text displayed on the shelf talkers.

In the present example, a first shelf talker 1108 is arranged just below the product position 1102, a second shelf talker 1109 is arranged at an end of the fixture 910 at the same height as the product position 1102, and a third shelf talker 1110 is arranged on top of the fixture 910 above the product position 1102.

The method 1500 comprises determining 1520 whether one or more detected shelf talkers 1108-310 comply with a prescribed shelf talker arrangement for the product associated with the electronic label 1101.

If the prescribed shelf talker arrangement is not complied with (indicated by N in FIG. 15), the method 1500 may proceed by signaling 1530 that a shelf talker arrangement for the product needs to be adjusted. The signaling may for example include information about what may be wrong with the current shelf talker arrangement, such as a missing shelf talker, an incorrect position of a shelf talker, or the wrong shelf talker being used in connection with a product.

If the prescribed shelf talker arrangement is complied with (indicated by Y in FIG. 15), no signaling may for example be needed.

Figure 16:
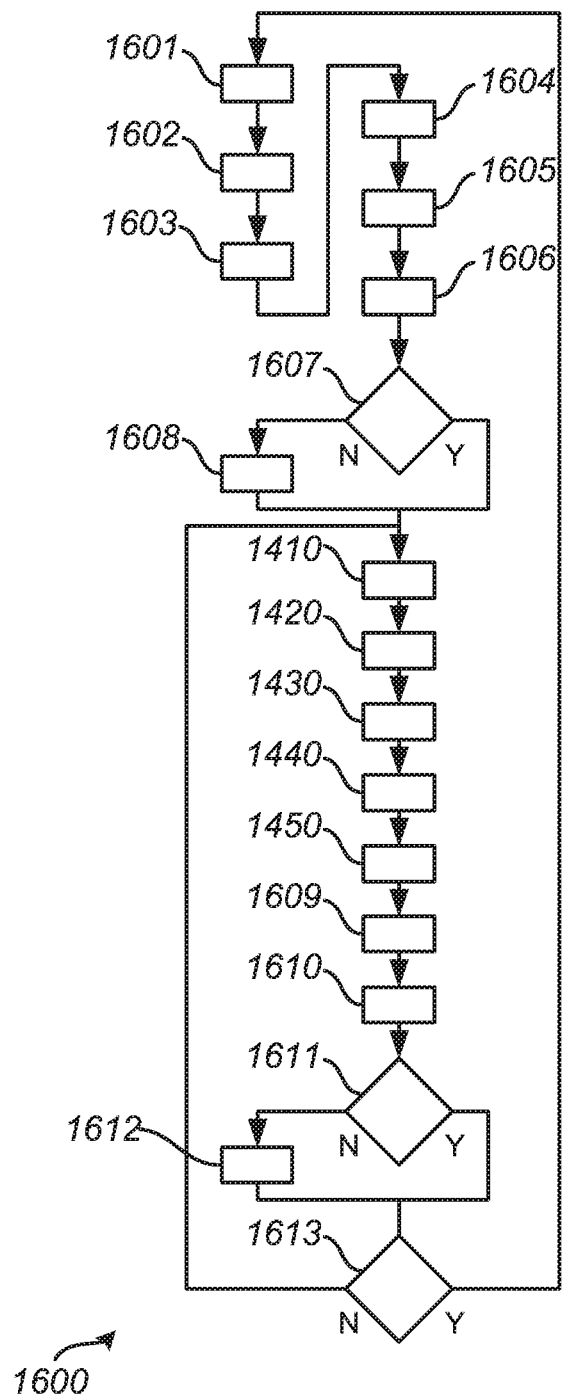

FIG. 16 is a flow chart of a method 1600 for estimating real-world positions of products, i.e. positions of products in an area 920 of a retail store in which the fixture 910 is arranged. The method 1600 may for example be performed by the system 900 described with reference to FIG. 9 (or by one or more components of the system 900).

Similarly to the method 1400 described with reference to FIG. 14, the method 1600 comprises the steps of controlling 1410 the electronic labels 912, receiving 1420 the images captured by the camera 930, detecting 1430 the distinct temporal patterns in the images, determining 1440 the label positions 1101 in the images, and determining 1450 at least one product position 1102 in the image 1100.

The method 1600 comprises estimating 1609, based on the determined product position 1102 in the image, a product position in the fixture 910 (e.g. a product position along the fixture 910). A product position in the fixture 910 may for example be expressed as: on the third shelf out of five counted from below, with equal distances to the left and right ends of the fixture 910.

The method 1600 comprises estimating 1610, based on the estimated product position in the fixture 910 and based on a position and orientation of the fixture 910 in the area 920 of the retail store, a product position in the area 920 of the retail store.

The position and orientation of the fixture 910 in the area 920 may have been entered manually in a database when the store was designed or the last time the fixture 910 was moved, or may have been entered automatically during a method for automatically determining positions and orientations of fixtures in the store.

Once the position and orientation of the fixture 910 is known, a product position in the fixture such as "on the third shelf out of five counted from below, with equal distances to the left and right ends of the fixture 910" may be converted into a real-world position, e.g. in the form Cartesian coordinates such as X, Y and Z coordinates in a coordinate system of the retail store.

The method 1600 may for example include steps for estimating the position and orientation of the fixture 910 using the electronic labels 912. The estimated position and orientation of the fixture 910 may then be employed in the step of estimating 1610 a product position in the area 920 of the retail store.

Similarly to the method 1400, described with reference to FIG. 14, the method 1600 may comprise controlling 1601 the electronic labels 912 to change their optical outputs, receiving 1602 images captured by the camera 930, detecting 1603 the distinct temporal patterns of optical changes in the images, and determining 1604 positions of the electronic labels 912 in the images.

The method 1600 may further comprise estimating 1605 (or computing an estimate), based on the determined label positions, a size, shape and position of the fixture 910 in the images.

Even if the boundaries of the fixture 910 may be difficult to distinguish in the images, the electronic labels 912 are distributed along the fixture 910 and the label positions therefore give an indication of the size, shape and position of the fixture 910 in the images. This is illustrated in FIGS. 12 and 13.

Figure 12:
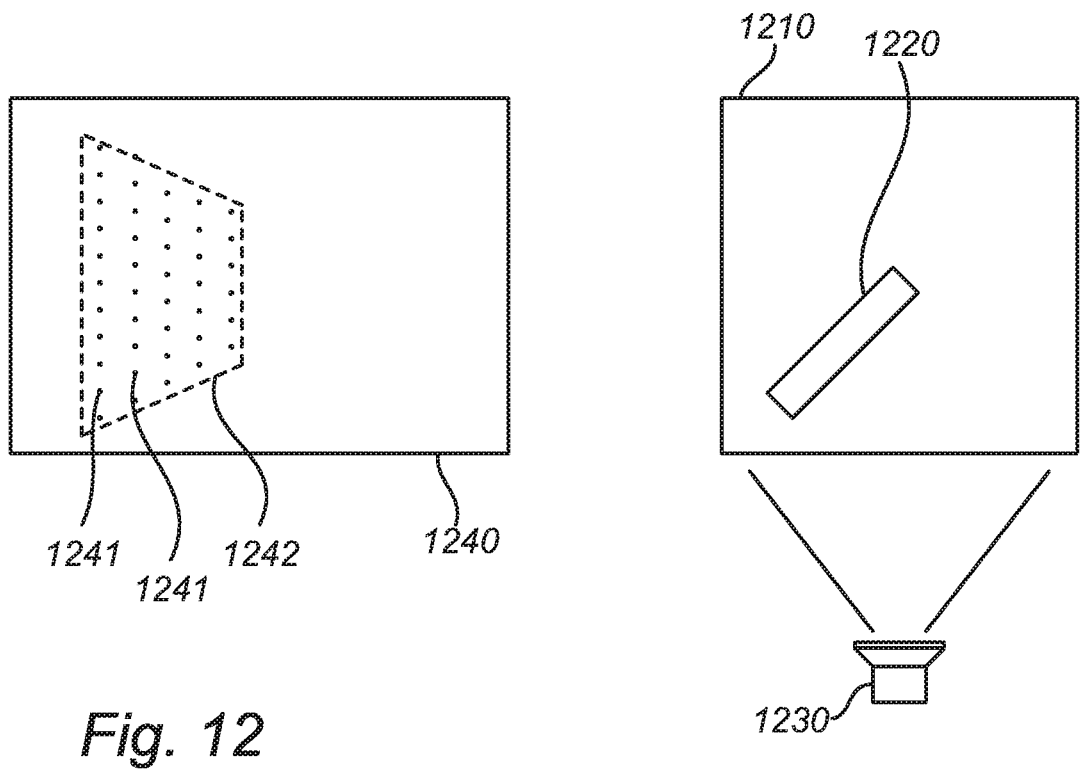
FIG. 12 shows positions of electronic labels in an image of a fixture, and an associated position and orientation of the fixture.

The right hand side of FIG. 12 is a top view of an area 1210 in which a fixture 1220 is arranged, wherein a camera 1230 captures images of the fixture 1220.

An image 1240 captured by the camera 1230 is shown on the left hand side of FIG. 12. As indicated in the image 1240, detected label positions 1241 may be employed to estimate a contour 1242 of the fixture 1220 in the image 1240, i.e. a size, shape and position of the fixture 1220 in the image 1240 may be estimated. If the real size and shape of the fixture 1220 is known, and camera attributes such as position, orientation and field of view of the camera 1230 are known, the position and orientation of the fixture 1220 in the area 1210 may be estimated based on the contour 1242. For example, the shape of the contour 1242 indicates that the fixture 1220 is arranged at an angle relative to the camera 1230.

Figure 13:
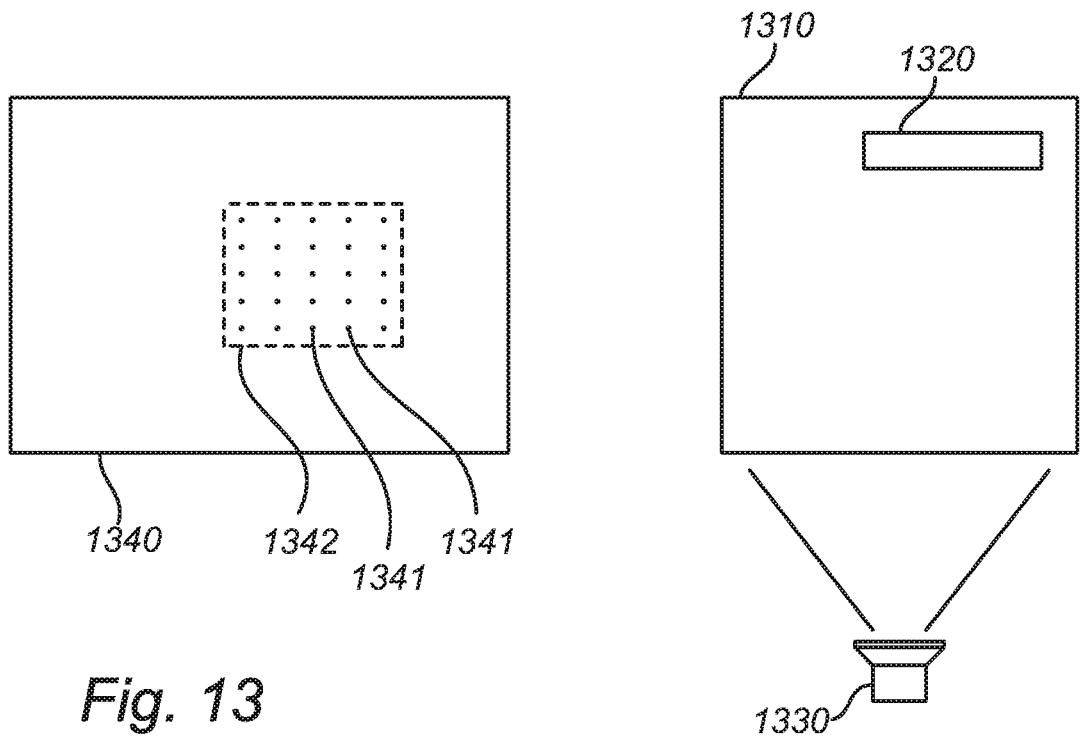
FIG. 13 shows positions of electronic labels in an image of a fixture, and an associated position and orientation of the fixture.

The right hand side of FIG. 13 is a top view of an area 1310 in which a fixture 1320 is arranged, wherein a camera 1330 captures images of the fixture 1320. In the present example, the respective areas 1210 and 1310, fixtures 1220 and 1320, and cameras 1230 and 1330 described with reference to FIGS. 12 and 13 are identical, but the position and orientation of the fixtures 1220 and 1320 in the areas 1210 and 1310 are different.

An image 1340 captured by the camera 1330 is shown on the left hand side of FIG. 13. As indicated in the image 1340, detected label positions 1341 may be employed to estimate a contour 1342 of the fixture 1220 in the image 1340, i.e. a size, shape and position of the fixture 1320 in the image 1340 may be estimated. If the real size and shape of the fixture 1320 is known, and camera attributes such as position, orientation and field of view of the camera 1330 are known, the position and orientation of the fixture 1320 in the area 1310 may be estimated based on the contour 1342.

As indicated by the respective contours 1242 and 1342, the size of the fixture 1320 as it appears in the image 1340 is smaller than the size of the fixture 1220 as it appears in the image 1240, which indicates that the fixture 1320 is located further away from the camera 1330 than the distance from the fixture 1220 to the camera 1230.

It will be appreciated that the label positions 1241 and 1341 in FIGS. 12 and 13 serve to illustrate that the contours 1242 and 1342 may be estimated, and that the particular label positions 1241 and 1341 shown in FIGS. 12 and 13 may not match the exact label positions obtained by processing images of a real fixture.

The method 1600 may comprise estimating 1606 (or computing an estimate of) the position and orientation of the fixture 910 based on the estimated size, shape and position of the fixture in the images (e.g. based on an estimated contour such as the contours 1242, 1342 described with reference to FIGS. 12 and 13) and based on knowledge of a real size and shape of the fixture 910.

The method 1600 may for example comprise determining 1607 whether the obtained estimates of the position and orientation of the fixture 910 in the area 920 agree with previously obtained estimates.

If the obtained estimates agree with the previously obtained estimates (indicated by Y in FIG. 16), the method 1600 may proceed to the step of controlling 1410 the electronic labels 912.

If at least one of the obtained estimates does not agree with previously obtained estimates (indicated by N in FIG. 16), the method 1600 may proceed by updating 1608 the shape and/or orientation of the fixture 910 in a database or in a map of the retail store in which the fixture 910 is arranged. The method 1600 may then proceed to the step of controlling 1410 the electronic labels 912.

After the step of estimating 1610 a product position in the area 920 of the retail store, the method 1600 may for example proceed by determining 1611 whether the obtained estimate agrees with a previously obtained estimate.

If the obtained estimate does not agree with previously obtained estimate (indicated by N in FIG. 16), the method 1600 may proceed by updating 1612 the estimated product position in a database or in a map of the retail store in which the fixture is arranged.

Estimation of the product positions may for example be performed more often than the estimation of the position and orientation of the fixture 910.

Estimation of the position and orientation of the fixture 910 may for example be performed once a week or once a month, while the estimation of the product positions may for example be performed one or more times a day.

The method 1600 may for example include a step 1613 where it is determined whether a certain time has passed since the latest estimation of the position and orientation of the fixture 910. If yes (indicated by Y in FIG. 16), the method restarts from the beginning at step 1601 for estimating a position and orientation of the fixture 910. If no (indicated by N in FIG. 16) the method 1600 instead restarts at step 1410 for estimating a product position.

The estimates obtained via the method 1600 (i.e. the estimated fixture position and orientation, and the estimated product positions) may for example be employed for keeping an up to date map over (or floor plan of) an area 920 in which the fixture 910 is arranged, or over a retail store including the area 920. The map may for example be displayed to customers or may be employed by employees of the retail store for restocking products. The map may also be employed for analyzing and optimizing product placement and logistics of the retail store in which the fixture is arranged 910.

The person skilled in the art realizes that the present invention is by no means limited to the preferred embodiments described above. On the contrary, many modifications and variations are possible within the scope of the appended claims. For example, the analysis (or processing) performed by the system 900 (or by one or more component of the system 900, such as the processing section 940 of the system 900) may for example be based on images captured by multiple cameras, e.g. arranged to capture images of the fixture 910 from different angles. It will be appreciated that the steps of the methods 1400, 1500, 1600 and 900, described with reference to FIGS. 6-9 and/or 14-17, may for example be combined into other methods. For example, a method may include both evaluation of shelf talker arrangements (as in the method 1500) and detection of the need to restock products (as in the method 1400). Additionally, variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The division of tasks between functional units referred to in the present disclosure does not necessarily correspond to the division into physical units; to the contrary, one physical component may have multiple functionalities, and one task may be carried out in a distributed fashion, by several physical components in cooperation. A computer program may be stored/distributed on a suitable medium, such as an optical storage medium or a solid-state medium supplied together with or as part of other hardware, but may also be distributed in other forms, such as via the Internet or other wired or wireless telecommunication systems. The mere fact that certain measures are recited in mutually different dependent claims does not indicate that a combination of these measures cannot be used to advantage. Any reference signs in the claims should not be construed as limiting the scope.

Examples

1. A method (1400, 1500, 1600, 1700) for determining positions of electronic labels (912) in images, the method comprising:

controlling (1410), via at least one control signal, the electronic labels to change their respective optical outputs, wherein the changes of optical outputs of the respective electronic labels include respective distinct temporal patterns of optical changes;

receiving (1420) a plurality of images (1100) containing the electronic labels and captured by a camera (930) at points in time such that the distinct temporal patterns of optical changes are distinguishable in the images;

detecting (1430) the distinct temporal patterns of optical changes in the images by at least analyzing the images; and determining (1440) positions (1101) of the respective electronic labels in the images as positions in the images at which the corresponding distinct temporal patterns of optical changes have been detected, wherein the method either comprises, or does not comprise:

determining (1450), for each of (or for at least one of) the electronic labels, a product position (1102) for a product associated with the electronic label in an image (1100) captured by the camera, wherein the product position is determined via computation based on the determined position (1101) of the electronic label and based on knowledge of a location of the product position relative to the determined position of the electronic label.

2. The method of example 1, wherein the method either comprises, or does not comprise:

determining (1450), for each of (or for at least one of) the electronic labels, a product position (1102) for a product associated with the electronic label in an image (1100) captured by the camera, wherein the product position is determined via computation based on the determined position (1101) of the electronic label and based on knowledge of a location of the product position relative to the determined position of the electronic label, wherein products are arranged at respective product positions (911) along a fixture (910), wherein electronic labels (912) associated with the respective products are arranged such that a product position for a product is obtainable once a position of the associated electronic label is known, and wherein the camera is arranged to capture images of the fixture.

3. A method (600, 700, 800) for determining a product position in an image of a fixture (110), wherein products are arranged at respective product positions (111) along the fixture, wherein electronic labels (112) associated with the respective products are arranged such that a product position for a product is obtainable once a position of the associated electronic label is known, and wherein a camera (130) is arranged to capture images of the fixture, the method comprising:

controlling (610), via control signals, an electronic label of said electronic labels to change optical output;

receiving (620), from the camera, an image (300) containing the electronic label and captured by the camera after the change of optical output has been initiated;

detecting (630), via analysis of the image by a processing section (140), a position (301) of the electronic label in the image based on a characteristic associated with the change of optical output; and determining (640), a product position (302) for the product associated with the electronic label in an image received from the camera, wherein the product position is determined via computation by the processing section based on the detected position and based on knowledge of a location of the product position relative to the detected position.

4. A system (100) for determining a product position in an image of a fixture (110), wherein products are arranged at respective product positions (111) along the fixture, wherein electronic labels (112) associated with the respective products are arranged such that a product position for a product is obtainable once a position of the associated label is known, and wherein a camera (130) is arranged to capture images of the fixture, the system comprising:

a processing section (140) configured to:

control, via control signals, an electronic label to change optical output;

receive, from the camera, an image (300) containing the electronic label and captured by the camera after the change of optical output has been initiated;

detect, via analysis of the image, a position (301) of the electronic label in the image based on a characteristic associated with the change of optical output; and determine, a product position (302) for the product associated with the electronic label in an image received from the camera, wherein the processing section is configured to determine the product position via computation based on the detected position and based on knowledge of a location of the product position relative to the detected position.

The invention claimed is:

1. A method for analyzing an image of a fixture, wherein products are arranged at respective product positions along the fixture, wherein electronic labels associated with the respective products are arranged such that a product position for a product is obtainable once a position of the associated electronic label is known, and wherein a camera is arranged to capture images of the fixture, the method comprising:

controlling an electronic label of said electronic labels to change optical output;

receiving, from the camera, an image containing the electronic label and captured after the change of optical output has been initiated;

detecting a position of the electronic label in the image based on a characteristic associated with the change of optical output; and determining, based on the detected position, a product position for the product associated with the electronic label in an image received from the camera.

2. The method of claim 1, further comprising:

determining, by at least analyzing said image received from the camera, whether there are any items of the product at the determined product position; or determining, by at least analyzing said image received from the camera, whether there is room for more items of the product at the determined product position.

3. The method of claim 2, further comprising:

in response to a determination that there are no items of the product at the product position, signaling that the product associated with the electronic label needs to be restocked; or in response to a determination that there is room for more items of the product at the product position, signaling that there is room for restocking the product associated with the electronic label.

4. The method of claim 1, further comprising:

detecting, by at least analyzing said image received from the camera, whether any shelf talkers are arranged at one or more positions associated with the determined product position; and determining whether one or more detected shelf talkers comply with a prescribed shelf talker arrangement for the product associated with the electronic label.

5. The method of claim 1, wherein the fixture is arranged in an area the method further comprising:

estimating, based on the determined product position in the image, a product position in the fixture; and estimating, based on the estimated product position in the fixture and based on a position and orientation of the fixture in the area, a product position in the area.

6. The method of claim 1, comprising:

receiving, from the camera, an image containing the electronic label and captured before the change of optical output has been initiated;

receiving, from the camera, an image containing the electronic label and captured after the change of optical output has been initiated; and detecting the position of the electronic label in the received images by at least analyzing a difference between the images captured before and after the change of optical output has been initiated.

7. The method of claim 1, comprising:

controlling the electronic labels to change their respective optical outputs, wherein the changes of optical outputs of the respective electronic labels include respective distinct temporal or spatial patterns of optical changes;

receiving, from the camera, a plurality of images containing at least some of the electronic labels and captured after at least one of the changes of optical outputs has been initiated;

detecting positions of the respective electronic labels in the images by at least analyzing the images, wherein identities of the respective electronic labels in the images are identified via the respective distinct temporal or spatial patterns of optical changes; and determining, based on the detected positions, product positions for the respective products associated with the respective electronic labels in an image received from the camera.

8. The method of claim 1, comprising:

controlling the electronic labels to change their respective optical outputs at respective distinct points in time;

receiving, from the camera, a sequence of images containing at least some of the electronic labels and captured between the respective points in time;

detecting positions of the respective electronic labels in the images by at least analyzing the images, wherein identities of the respective electronic labels in the images are identified via points in time for which changes of optical outputs for the respective electronic labels in the images are detected; and determining, based on the detected positions, product positions for the respective products associated with the respective electronic labels in an image received from the camera.

9. The method of claim 7, wherein the fixture is arranged in an area, the method comprising:

estimating, based on at least some of the detected label positions, a size, shape and position of the fixture in the images; and estimating a position or orientation of the fixture in the area based on the estimated size, shape and position of the fixture in the images and based on knowledge of a real size and shape of the fixture.

10. The method of claim 8, wherein the fixture is arranged in an area, the method comprising:

estimating, based on at least some of the detected label positions, a size, shape and position of the fixture in the images; and estimating a position or orientation of the fixture in the area based on the estimated size, shape and position of the fixture in the images and based on knowledge of a real size and shape of the fixture.

11. A system for analyzing an image of a fixture, wherein products are arranged at respective product positions along the fixture, wherein electronic labels associated with the respective products are arranged such that a product position for a product is obtainable once a position of the associated label is known, and wherein a camera is arranged to capture images of the fixture, the system comprising:

a processing section configured to:
control an electronic label to change optical output;
receive, from the camera, an image containing the electronic label and captured after the change of optical output has been initiated;
detect a position of the electronic label in the image based on a characteristic associated with the change of optical output; and
determine, based on the detected position, a product position for the product associated with the electronic label in an image received from the camera.

12. A method for determining positions of electronic labels in images, the method comprising:

controlling, via at least one control signal, the electronic labels to change their respective optical outputs, wherein the changes of optical outputs of the respective electronic labels include respective distinct temporal patterns of optical changes;

receiving a plurality of images containing the electronic labels and captured by a camera at points in time such that the distinct temporal patterns of optical changes are distinguishable in the images;

detecting the distinct temporal patterns of optical changes in the images by at least analyzing the images; and determining positions of the respective electronic labels in the images as positions in the images at which the corresponding distinct temporal patterns of optical changes have been detected.

13. The method of claim 12, comprising, for each of a plurality of time intervals:

controlling a subset of the electronic labels to provide optical outputs distinguishing the electronic labels in the subset from the other electronic labels;

receiving an image containing the electronic labels and captured by the camera during the time interval; and detecting, by at least analyzing the image, at least one position in the image corresponding to a position of an electronic label from said subset, wherein different subsets of the electronic labels are controlled to provide the distinguishable optical output for the different time intervals, such that said distinct temporal patterns of optical changes are provided by the respective electronic labels, and wherein the distinct temporal patterns of optical changes are detected in the images based on the positions detected in the respective images.

14. The method of claim 13, wherein the number of electronic labels is larger than the number of time intervals employed for determining the positions of the electronic labels in the images.

15. The method of claim 13, wherein the electronic labels in said subset are controlled to provide optical outputs of different intensity and/or spectral composition than the other electronic labels.

16. The method of claim 13, comprising, for each of the time intervals:

selecting, by a control section, the subset of the electronic labels to be controlled to provide the distinguishable optical output.

17. The method of claim 12, wherein information about the distinct temporal patterns of optical changes is stored in the respective electronic labels, and wherein controlling the electronic labels to change their respective optical outputs includes controlling the electronic labels to initiate their respective temporal patterns of optical changes.

18. The method of claim 12, further comprising, for at least one of the electronic labels:

determining a position of an object associated with the electronic label in an image captured by the camera, wherein the position of the object is determined via computation based on the determined position of the electronic label and based on knowledge of a location of the object relative to the determined position of the electronic label.

19. The method of claim 12, comprising, for at least one of the electronic labels:

determining a product position for a product associated with the electronic label in an image captured by the camera, wherein the product position is determined via computation based on the determined position of the electronic label and based on knowledge of a location of the product position relative to the determined position of the electronic label.

20. The method of claim 19, further comprising:
determining, by at least analyzing said image captured by the camera, whether there are any items of the product at the determined product position; or
determining, by at least analyzing said image captured by the camera, whether there is room for more items of the product at the determined product position.

21. The method of claim 20, further comprising:
in response to a determination that there are no items of the product at the product position, signaling that the product associated with the electronic label needs to be restocked; or
in response to a determination that there is room for more items of the product at the product position, signaling that there is room for restocking the product associated with the electronic label.

22. The method of claim 19, further comprising:
detecting, by at least analyzing said image captured by the camera, whether any shelf talkers are arranged at one or more positions associated with the determined product position; and
determining whether one or more detected shelf talkers comply with a prescribed shelf talker arrangement for the product associated with the electronic label.

23. The method of claim 19, further comprising:
estimating, based on the determined product position in said image captured by the camera, a product position in a fixture; and
estimating, based on the estimated product position in the fixture and based on a position and orientation of the fixture in an area, a product position in the area.

24. The method of claim 12, wherein products are arranged at respective product positions along a fixture, wherein electronic labels associated with the respective products are arranged such that a product position for a product is obtainable once a position of the associated electronic label is known, wherein the fixture is arranged in an area, the method comprising:
estimating, based on at least some of the determined label positions, a size, shape and position of the fixture in the images; and
estimating a position or orientation of the fixture in the area based on the estimated size, shape and position of the fixture in the images and based on knowledge of a real size and shape of the fixture.

25. A system for determining positions of electronic labels in images, the system being configured to:
control, via at least one control signal, the electronic labels to change their respective optical outputs, wherein the changes of optical outputs of the respective electronic labels include respective distinct temporal patterns of optical changes;
receive a plurality of images containing the electronic labels and captured by a camera at points in time such that the distinct temporal patterns of optical changes are distinguishable in the images;
detect the distinct temporal patterns of optical changes in the images by at least analyzing the images; and
determine positions of the respective electronic labels in the images as positions in the images at which the corresponding distinct temporal patterns of optical changes have been detected.

* * * * *